US012629773B2

(12) United States Patent
    Johnson et al.

(10) Patent No.: US 12,629,773 B2
(45) Date of Patent: May 19, 2026

(54) LASER MODULE END EFFECTOR FOR ROBOTIC DEVICE

(71) Applicant: The Boeing Company, Chicago, IL (US)

(72) Inventors: Matthew C. Johnson, Edgewood, WA (US); Lisa Ann Cardon, Lake Tapps, WA (US); Matthew W. Smith, Puyallup, WA (US); Soren Mortvedt, Tacoma, WA (US)

(73) Assignee: The Boeing Company, Arlington, VA (US)

( * ) Notice: Subject to any disclaimer, the term of this patent is extended or adjusted under 35 U.S.C. 154(b) by 1066 days.

(21) Appl. No.: 17/653,639

(22) Filed: Mar. 4, 2022

(65) Prior Publication Data

US 2022/0314365 A1 Oct. 6, 2022

Related U.S. Application Data

(60) Provisional application No. 63/168,150, filed on Mar. 30, 2021.

(51) Int. Cl.
    *B23K 26/082* (2014.01)
    *B23K 26/06* (2014.01)
    *B23K 26/064* (2014.01)
    *B25J 11/00* (2006.01)

(52) U.S. Cl.
    CPC ........ *B23K 26/082* (2015.10); *B23K 26/0648* (2013.01); *B25J 11/005* (2013.01)

(58) Field of Classification Search
    CPC .............. B23K 26/082; B23K 26/0648; B23K 26/032; B23K 26/048; B23K 26/106; B23K 26/382; B23K 26/0884; B23K 26/142; B23K 26/36; B23K 26/01; B25J 11/005;

(Continued)

(56) References Cited

U.S. PATENT DOCUMENTS 7,633,033 B2 * 12/2009 Thomas ............... B23K 26/082
                                                    219/121.81
8,030,594 B2 * 10/2011 Thomas ................. B23K 26/04
                                                    219/121.62

(Continued)

FOREIGN PATENT DOCUMENTS

CN          110976432        4/2020
CN          110976432 A  *  4/2020  ........... B08B 7/0042

(Continued)

OTHER PUBLICATIONS

English Translation of CN 110976432 (Year: 2024).*

(Continued)

*Primary Examiner* — Steven W Crabb
*Assistant Examiner* — Ket D Dang

(57) ABSTRACT

A laser module includes a laser source and at least one air knife. The laser source is configured to be coupled to a robotic arm of a robotic device, and emit a laser beam for processing a workpiece having a workpiece surface. The air knife is configured to be coupled to the robotic arm, and discharge an airflow sheet in a direction toward a laser spot where the laser beam impinges the workpiece surface, for clearing contaminants generated by impingement of the laser beam.

20 Claims, 30 Drawing Sheets

FIG. 3

(58) Field of Classification Search
CPC ........ A61K 31/565; A61P 13/02; A61P 15/00;
A61P 43/00
USPC ........................................................ 219/121
See application file for complete search history.

(56) References Cited

U.S. PATENT DOCUMENTS

| | | | | |
|---|---|---|---|---|
| 8,487,209 B2 * | 7/2013 | Sakamoto | .......... | B23K 26/0884 |
| | | | | 219/121.84 |
| 8,536,483 B2 * | 9/2013 | Thomas | ............... | B23K 26/082 |
| | | | | 219/121.68 |
| 8,610,025 B2 * | 12/2013 | Thomas | ................. | B23K 26/03 |
| | | | | 219/121.68 |
| 10,751,766 B2 * | 8/2020 | Johnson | ............... | B23K 26/361 |
| 2003/0201578 A1 * | 10/2003 | Li | .......................... | B23K 26/40 |
| | | | | 425/173 |
| 2007/0272667 A1 * | 11/2007 | Lei | ........................ | H05K 3/0035 |
| | | | | 219/121.71 |
| 2008/0272096 A1 * | 11/2008 | Alpay | ................ | B23K 26/0665 |
| | | | | 219/121.74 |
| 2017/0057016 A1 * | 3/2017 | Finn | ...................... | B23K 26/361 |
| 2019/0126392 A1 * | 5/2019 | Jefferies | ............... | B23K 26/048 |
| 2019/0143382 A1 * | 5/2019 | Johnson | ............... | B23K 26/402 |
| | | | | 219/121.68 |
| 2021/0086305 A1 * | 3/2021 | Mori | .................... | B23K 26/142 |

FOREIGN PATENT DOCUMENTS

| | | | | | | |
|---|---|---|---|---|---|---|
| EP | 2648873 | A1 | * | 10/2013 | ........ | B23K 26/0821 |
| EP | 2648873 | | | 5/2018 | | |
| EP | 3689526 | | | 8/2020 | | |
| EP | 3689526 | A1 | * | 8/2020 | ............ | B23K 26/00 |
| JP | 2005131709 | | | 5/2005 | | |
| JP | 2005131709 | B2 | * | 5/2005 | | |
| WO | WO-9532834 | A1 | * | 12/1995 | ............ | B23K 26/06 |
| WO | WO-2013024472 | A1 | * | 2/2013 | ............ | H05K 13/08 |
| WO | WO-2015125522 | A1 | * | 8/2015 | ........ | B23K 26/1438 |
| WO | WO-2015126438 | A1 | * | 8/2015 | ........ | B23K 26/0821 |

OTHER PUBLICATIONS

English Translation of EP 2648879 (Year: 2024).*
English Translation of JP 2005131709 (Year: 2024).*
English version of WO 9532834 U.S. Pat. No. 5,902,499 (Year: 1999).*
English Translation WO 2015125522 (Year: 2025).*
Exair Corp., Exair_Air_Knife web page, available at < https://www.exair.com/index.php/products/air-knives/sak/air-knife.html >, received on Jan. 5, 2021.
IMO Corporation, Slew_Drive datasheet, retrieved on Dec. 22, 2020.
DPSS Laser, Inc., Samurai Laser Marker, retrieved on Dec. 7, 2020.
Industrial Laser Solutions, "Laser roughening aids engine production," retrieved on Dec. 7, 2020.
Coherent, Inc., AVIA NX laser datasheet, retrieved on Dec. 6, 2020.
ScanLab, Inc., SCANcube III datasheet, retrieved on Dec. 4, 2020.
EPO, Extended European Search Report for Appl. No. 22159741. issued on Oct. 19, 2022.

* cited by examiner

500

EMITTING A LASER BEAM FROM A LASER SOURCE COUPLED TO A ROBOTIC ARM OF A ROBOTIC DEVICE

502

DISCHARGING, FROM AT LEAST ONE AIR KNIFE COUPLED TO THE ROBOTIC ARM, AN AIRFLOW SHEET IN A DIRECTION TOWARD A LASER SPOT WHERE THE LASER BEAM IMPINGES THE WORKPIECE SURFACE, FOR CLEARING CONTAMINANTS GENERATED BY IMPINGEMENT OF THE LASER BEAM

504

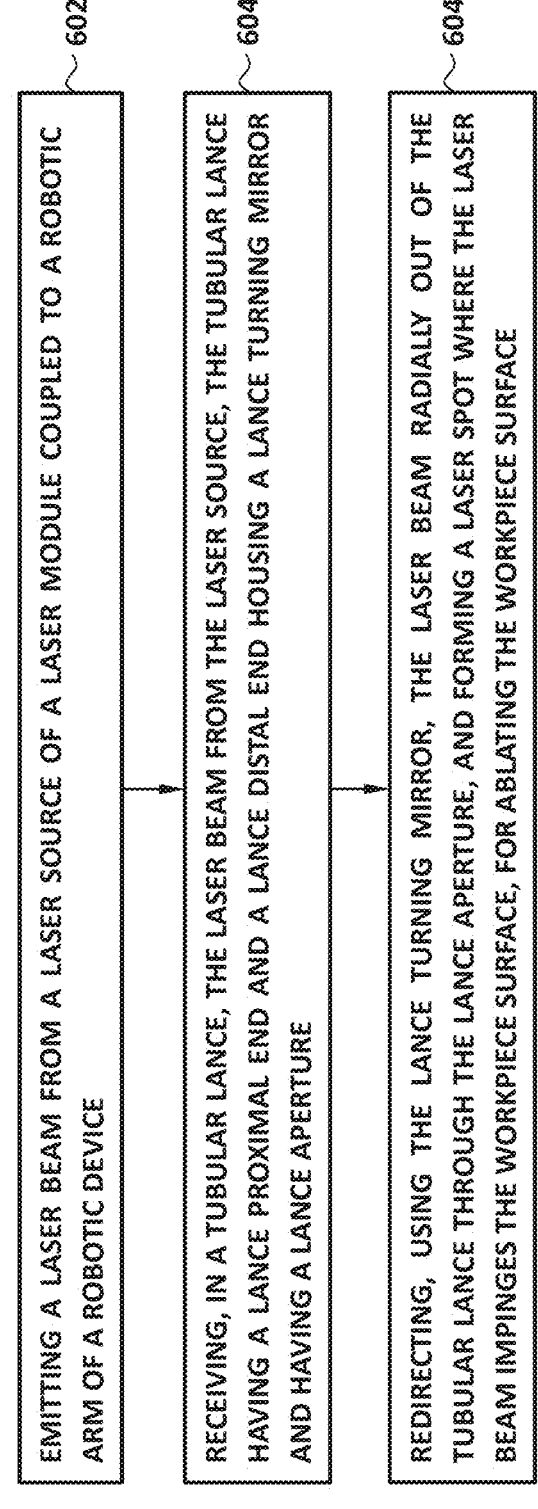

600

EMITTING A LASER BEAM FROM A LASER SOURCE OF A LASER MODULE COUPLED TO A ROBOTIC ARM OF A ROBOTIC DEVICE

602

RECEIVING, IN A TUBULAR LANCE, THE LASER BEAM FROM THE LASER SOURCE, THE TUBULAR LANCE HAVING A LANCE PROXIMAL END AND A LANCE DISTAL END HOUSING A LANCE TURNING MIRROR AND HAVING A LANCE APERTURE

604

REDIRECTING, USING THE LANCE TURNING MIRROR, THE LASER BEAM RADIALLY OUT OF THE TUBULAR LANCE THROUGH THE LANCE APERTURE, AND FORMING A LASER SPOT WHERE THE LASER BEAM IMPINGES THE WORKPIECE SURFACE, FOR ABLATING THE WORKPIECE SURFACE

LASER MODULE END EFFECTOR FOR ROBOTIC DEVICE

CROSS-REFERENCE TO RELATED APPLICATION

This non-provisional application claims priority to pending U.S. Provisional Application Ser. No. 63/168,150, entitled LASER MODULE END EFFECTOR FOR ROBOTIC DEVICE, filed Mar. 30, 2021, and which is incorporated herein by reference in its entirety.

FIELD

The present disclosure relates generally to manufacturing systems and, more particularly, to a laser module configured as an end effector for a robotic device.

BACKGROUND

The manufacturing or refurbishment of a structure may include preparing the surfaces of the structure to receive protective and/or decorative coatings. For example, the manufacturing of a polymer-matrix composite structure may include preparing the composite surfaces to receive paint, which may include primer, a topcoat, and sealant. The refurbishment of a metallic structure or a composite structure may include removing at least a portion of the thickness of existing paint prior to repainting the structure.

Conventional surface preparation techniques include manually abrading the surface, such as by hand sanding. Hand sanding a surface increases the surface roughness, which improves the adhesion of a subsequently applied coating. Although effective for its intended purpose, manually applied abrasion is labor intensive and presents process control challenges. For a production program that involves manufacturing large structures, the use of manually applied abrasion can have a significant effect on the program production rate. In addition, manually applied abrasion present challenges in controlling the depth of material removed. Furthermore, manually applied abrasion presents challenges in accessing confined areas of a structure, such as part interiors, pockets, and cavities of the structure.

As can be seen, there exists a need in the art for an automated system and method of surface preparation that can be performed at a high rate, and with a high degree of control with regard to depth of material removed. Ideally, the system and method allows for access to surfaces in confined areas of the structure.

SUMMARY

The above-noted needs associated with surface preparation are specifically addressed and alleviated by the present disclosure which provides a laser module having a laser source and at least one air knife. The laser source is configured to be coupled to a robotic arm of a robotic device, and emit a laser beam for processing a workpiece having a workpiece surface. The air knife is configured to be coupled to the robotic arm, and discharge an airflow sheet in a direction toward a laser spot where the laser beam impinges the workpiece surface, for clearing contaminants generated by impingement of the laser beam.

Also disclosed is a laser module having a laser source, a laser scanner, and at least one air knife. The laser source is configured to be coupled to a robotic arm of a robotic device, and emit laser beam pulses. The laser scanner is configured to receive the laser beam pulses from the laser source, and scan the laser beam pulses over a scan field on a workpiece surface of a workpiece. The air knife is configured to be coupled to the robotic arm, and discharge an airflow sheet in a direction toward a laser spot where the laser beam pulses impinge the workpiece surface.

In addition, disclosed is a method of processing a workpiece, including emitting a laser beam from a laser source of a laser module coupled to a robotic arm of a robotic device. The method additionally includes emitting, from at least one air knife of the laser module, an airflow sheet in a direction toward a laser spot where the laser beam impinges a workpiece surface, for clearing contaminants generated by impingement of the laser beam.

The features, functions and advantages that have been discussed can be achieved independently in various examples of the present disclosure or may be combined in yet other examples, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 38 is a flowchart of operations included in a method of processing a workpiece using a laser module having a tubular lance.

DETAILED DESCRIPTION

Figure 1:
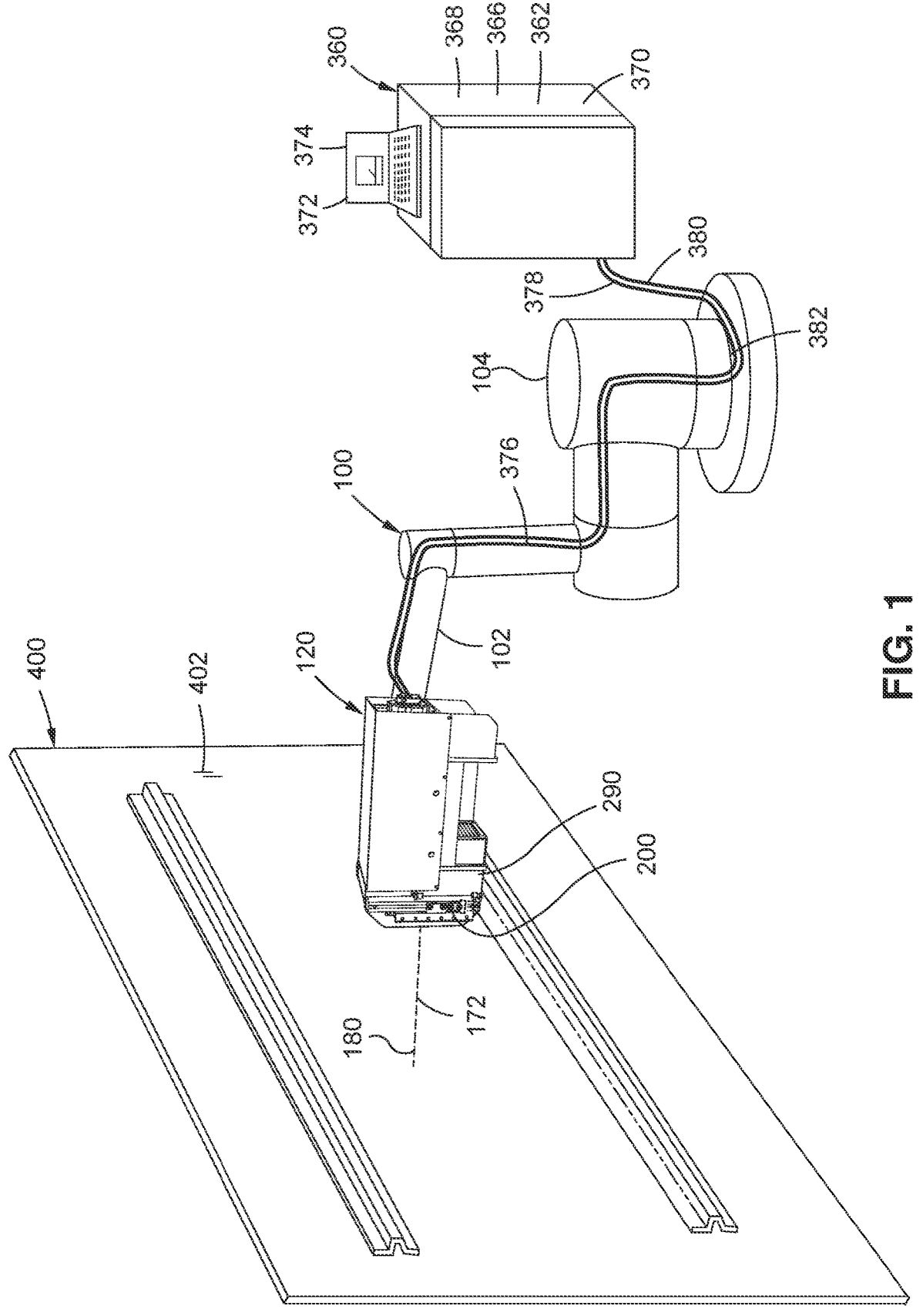
FIG. 1 is a rear perspective view of an example of a laser module coupled to a robotic device, and emitting a laser beam toward a workpiece for forming a laser spot where the laser beam impinges on the workpiece surface for processing (e.g., ablating) the workpiece surface.

Referring now to the drawings which illustrate preferred and various examples of the disclosure, shown in FIG. 1 is an example of a laser module 120 coupled to a robotic device 100. The presently-disclosed laser module 120 is shown emitting a laser beam 172 toward a workpiece surface 402 of a workpiece 400. The laser module 120 includes a laser source 150 (FIG. 9), and is coupled to a robotic arm 102 of the robotic device 100. The laser module 120 includes at least one air knife 200 coupled to the robotic arm 102. In the example of FIGS. 1-4, the laser module 120 includes two air knives 200 located respectively on opposite sides of the laser source 150. Each air knife 200 is configured to discharge a high-velocity airflow sheet 206 (FIG. 3) of compressed air in a direction toward a laser spot 180 where the laser beam 172 impinges the workpiece surface 402, for clearing contaminants 420 (FIGS. 6-7) generated by impingement of the laser beam 172 on the workpiece surface 402. By clearing contaminants 420, the air knives 200 prevent the impedance, dilution, and/or blocking of the laser beam 172, and thereby allow for precise control of the amount of laser power that impinges the workpiece surface 402 being ablated. In addition, the airflow sheets 206 prevent contaminants 420, in the form of particles and fumes, from contacting and damaging the components of the laser module 120, as described in greater detail below.

Referring to FIG. 1, the laser module 120 and the robotic device 100 are controlled by one or more controllers 368, which may be housed in a cabinet 360. The controllers 368 comprise one or more computers for operating the various components of the laser module 120. For example, the controllers 368 include a scanner computer 366 for operating a laser scanner 260 (FIG. 3), which is housed in a sensor housing 290 of the laser module 120. In addition, the controllers 368 include a computer for operating one or more sensors 270 (FIG. 3), which are also housed in the sensor housing 290. Power and data are provided to the laser module 120 via one or more utility lines 376 (e.g., power cables 378, communication cables 380, etc.) extending between the laser module 120 and the cabinet 360. The cabinet 360 may also contain a chiller 362, which is fluidically coupled, via cooling hoses 382, to the laser source 150 for cooling the laser source 150 during operation. Also shown is a display monitor 372 (e.g., a laptop computer 374) which may be used to view images of the workpiece surface 402 generated by one or more imaging devices 278 (e.g., cameras—FIG. 3).

Figure 2:
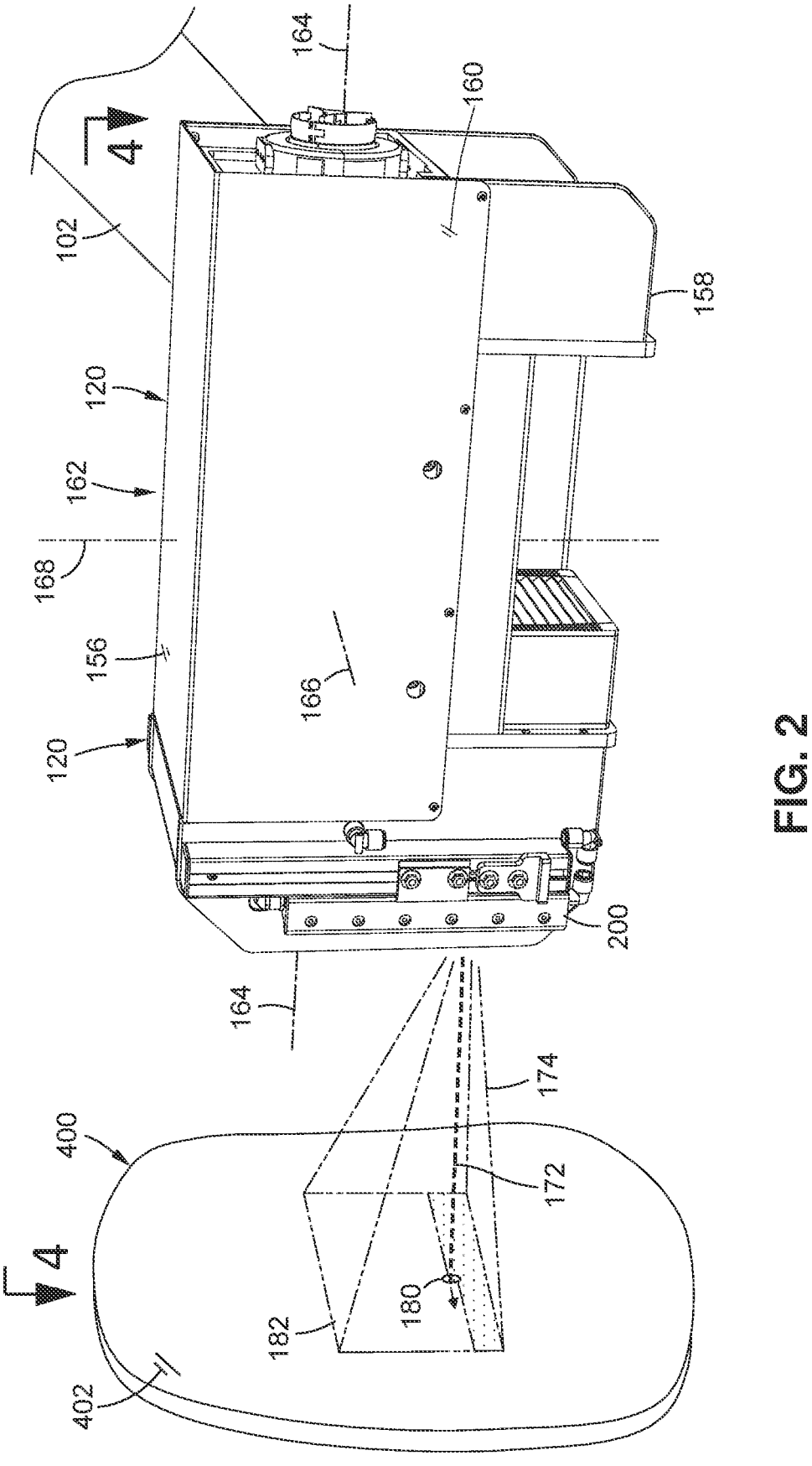
FIG. 2 is an enlarged perspective view of the example of the laser module of FIG. 1 showing a three-dimensional laser field of view of the laser beam, and the resulting scan field within which the laser spot is moved for processing the workpiece surface.
Figure 5:
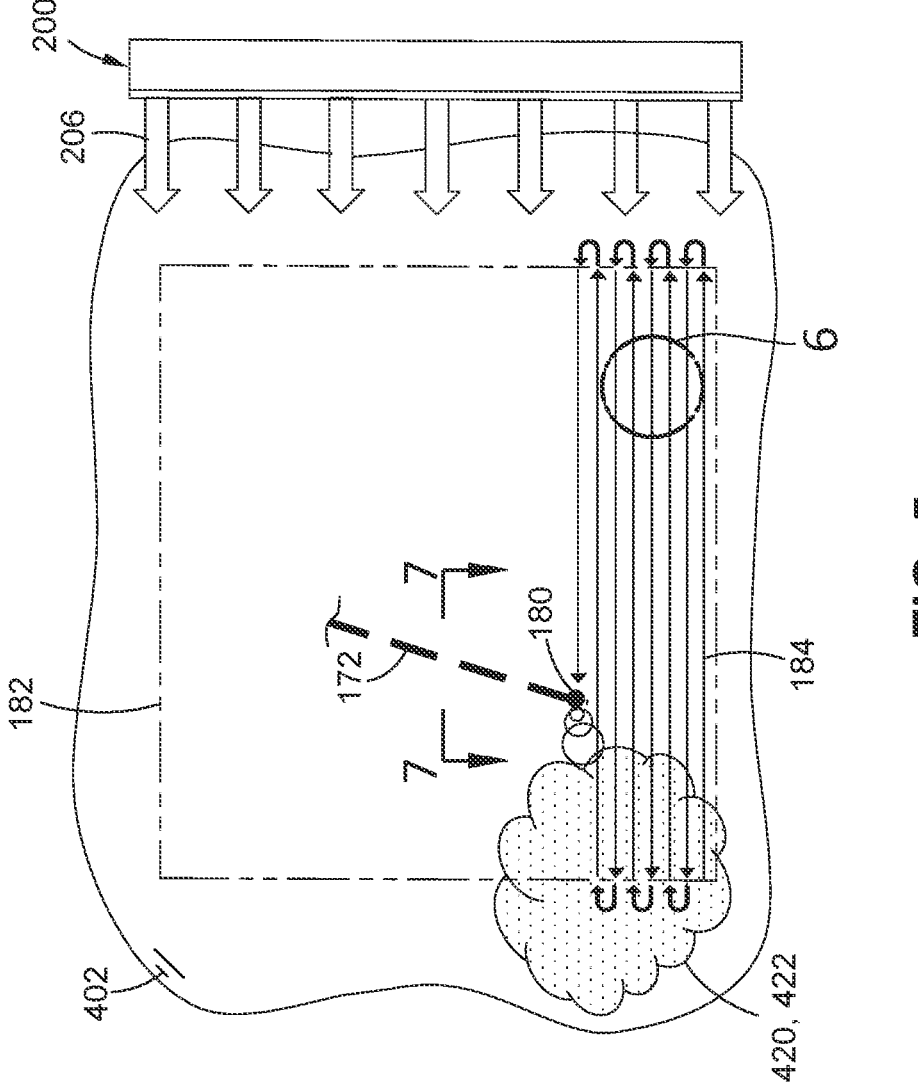
FIG. 5 is a schematic illustration of an example of a square-shaped scan field on a workpiece surface, and illustrating an example of a scanning path in which the laser spot is moved along parallel rows defining a serpentine shape, and further schematically illustrating an air knife discharging an airflow sheet toward the laser spot for blowing the contaminants away from the scan field of view.
Figure 13:
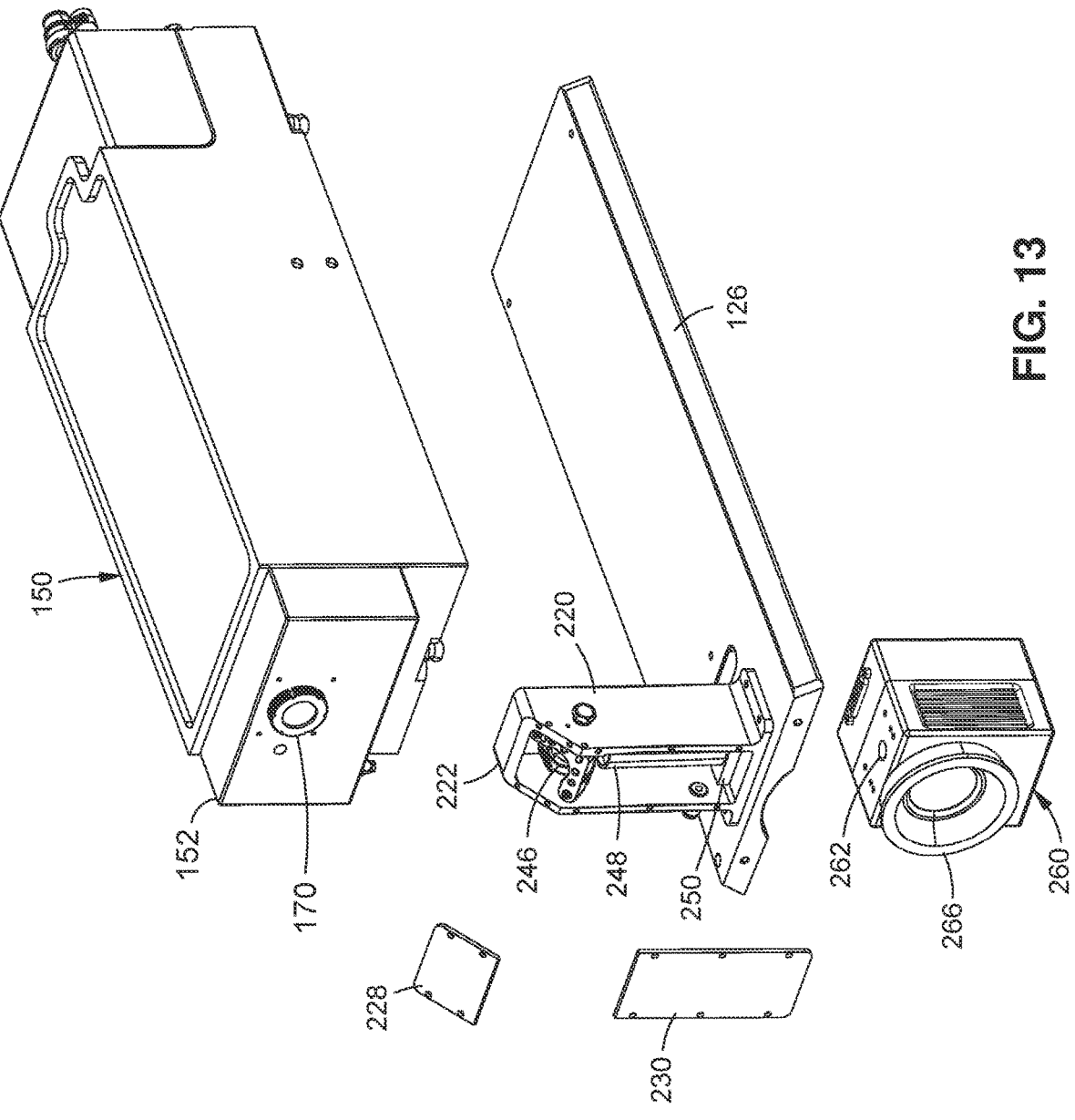
FIG. 13 is a partially exploded perspective view of several components of the laser module, including the laser source, the beam conditioning module, and the laser scanner.

FIG. 2 shows an example of the laser module 120 processing a workpiece 400, and illustrating the laser field of view 174 of the laser beam 172, and the resulting scan field 182 within which the laser spot 180 is moved (e.g., via the laser scanner 260—FIG. 3) along the workpiece surface 402 while the laser module 120 is held stationary at a given spatial location. In some examples, the laser module 120 may process a workpiece surface 402 using a technique referred to as tiling, wherein the robotic arm 102 moves the laser module 120 to a series of spatial locations. As described in greater detail below, at each spatial location, the laser module 120 is held stationary while the laser beam 172 is scanned within the boundaries of the scan field 182 on the workpiece surface 402. After scanning the area within the scan field 182, the robotic arm 102 moves the laser module 120 to a new spatial location, and the laser beam 172 is scanned along the scan field 182 located immediately adjacent to the previous scan field 182. The process continues until the desired area of the workpiece surface 402 has been processed (e.g., laser ablated). Although FIGS. 2 and 5 show the scan field 182 having a square shape, the shape of the scan field 182 may be of any geometry that is compatible with the limitations of the laser optical equipment 244, such as the laser source output window 170 (FIG. 13), the conditioning module turning mirror 246 (FIG. 13), the beam expander 248 (FIG. 13), and the fixed focus lens 250 (FIG. 13). In other examples described below, the shape of the scan field 182 is hexagonal (e.g., see FIGS. 32-37), and which is referred to below as a hexagonal scan field (e.g., a first hexagonal scan field 450).

Figure 3:
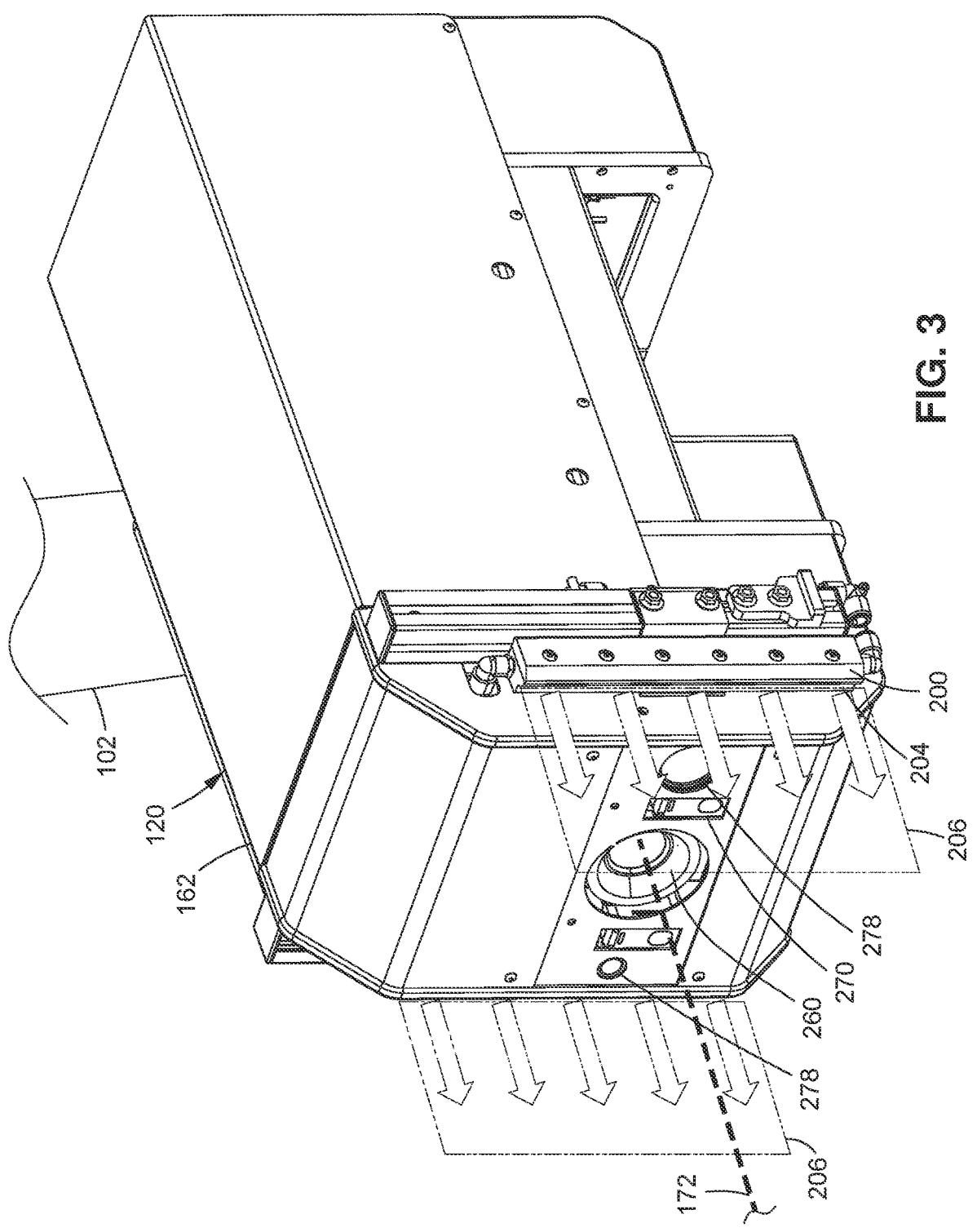
FIG. 3 is a front perspective view of the example of the laser module of FIGS. 1-2, illustrating the laser beam emitted by the laser module, and further illustrating airflow sheets discharged respectively by a pair of air knives located on opposite sides of the laser module, for clearing contaminants generated by impingement of the laser beam on the workpiece surface.
Figure 4:
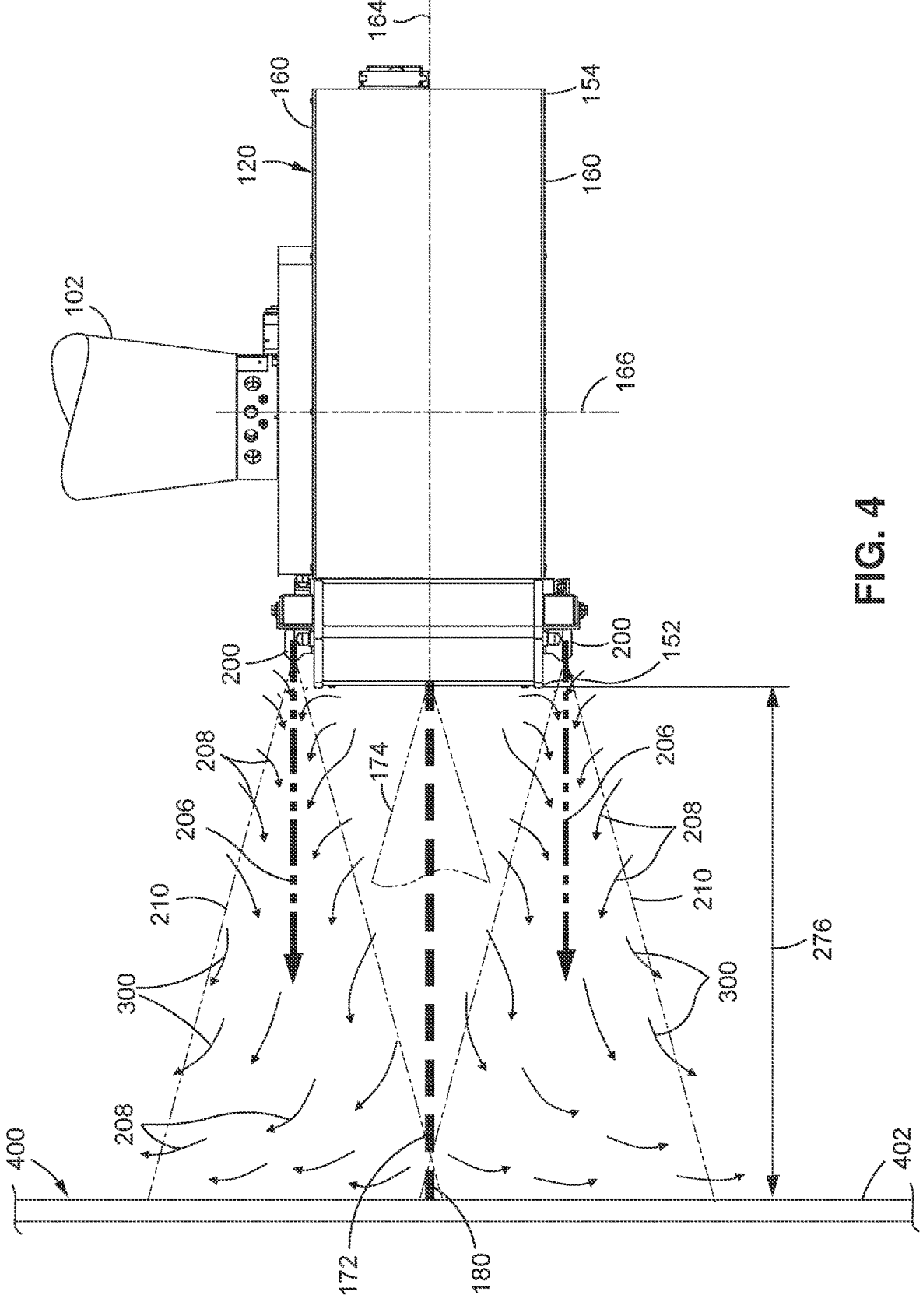
FIG. 4 is a top view of the laser module taken along lines 4-4 of FIG. 2, and illustrating the airflow sheets blowing toward the workpiece surface, and entraining ambient air which results in air wedges that overlap the laser spot and clears the contaminants generated by impingement of the laser beam.

Referring to FIGS. 3-4, shown is an example of the laser module 120 emitting a laser beam 172, and also showing a pair of airflow sheets 206 discharged respectively by a pair of air knives 200. The air knives 200 may be fluidically coupled to a compressed air source (not shown). Each air knife 200 has a linear air slot 204 configured to discharge a high-velocity airflow sheet 206 of compressed air toward the laser spot 180 on the workpiece surface 402. In the example shown in the figures, the air knife 200 is identified as a Super Air knife 200, commercially available from ExAir Corporation, of Cincinnati, Ohio. The air knives 200 are mounted in a manner such that the airflow sheets 206 are discharged in a direction non-perpendicular to the laser beam 172. The airflow sheet 206 may be generally parallel to the laser beam 172. The air knives 200 are shown mounted proximate the front end 152 (FIG. 9) of the laser source 150. In the example shown, the air knives 200 are mounted such that when the laser module 120 is in the upright orientation 162 shown in the figures, the linear air slots 204 are vertically oriented. However, the air knives 200 may be mounted to the laser module 120 in any one of a variety of alternative orientations.

As shown in FIG. 4, each airflow sheet 206 entrains or draws in the surrounding ambient air 300, which adds to the total volume of air for clearing contaminants 420 (FIG. 9) away from the workpiece surface 402. The entrained air 208 within the airflow sheet 206 results in the formation of an expanding air wedge 210 flowing toward the workpiece surface 402. Advantageously, a relatively high volume of ambient air 300 may be entrained into the airflow sheets 206. For example, each air knife 200 may entrain up to 40 parts ambient air 208 to 1 part compressed air from the airflow sheet 206. As shown in FIG. 4, the air knives 200 are mounted such that the air wedges 210 at least partially overlap the laser spot 180 where the laser beam 172 impinges the workpiece surface 402. In addition, the air wedges 210 encompass or overlap the laser spot 180 as the laser beam 172 is moved within the scan field 182 (FIG. 5). As mentioned above, the air wedges 210 blow contaminants 420 away from the workpiece surface 402. In addition, the air wedges 210 clear contaminants 420 out of the three-dimensional space between the laser module 120 and the workpiece surface 402, thereby preventing the contaminants 420 (e.g., plasma, fumes, etc.) from impeding, diluting, and/or blocking the laser beam 172.

Figure 6:
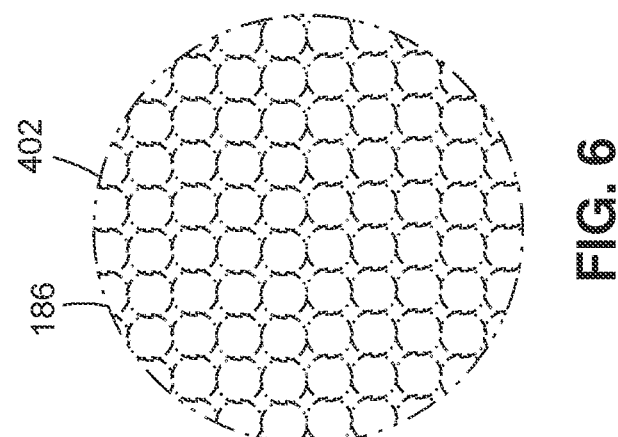
FIG. 6 is an illustration of a spot pattern of laser spots formed by the laser beam when operated in a pulsing manner.

Referring to FIGS. 5-6, shown in FIG. 5 is a schematic illustration of an example of a square-shaped scan field 182 on a workpiece surface 402. Also shown is a scanning path 184 along which the laser spot 180 is moved in raster mode along parallel rows in a bi-directional, serpentine manner, via the laser scanner 260. In addition, shown is a schematic illustration of an example of an air knife 200 discharging an airflow sheet 206 toward the laser spot 180 for blowing contaminants 420 away from the scan field 182. In the example shown, the laser source 150 (FIG. 9) emits the laser beam 172 as a pulsed laser beam 172. The laser source 150 is configured to emit laser beam 172 pulses in a precisely-fixed pulse repetition rate as the laser spot 180 is moved (e.g., via the laser scanner 260) along the scanning path 184. High-precision galvanometer mirrors (not shown) in the laser scanner 260 direct the laser beam 172 to place the individual laser beam 172 pulses on the workpiece surface 402 at a predetermined spacing and overlap between individual laser spots 180. Each laser beam 172 pulse ablates a thin layer of the workpiece surface 402. The workpiece surface 402 area within the scan field 182 may be completely ablated, one laser spot 180 at a time, in rows from bottom to top, in a single pass. Scanning the horizontal rows from bottom to top (instead of top to bottom) avoids leaving loose effluent 422 on the workpiece surface 402. FIG. 6 shows the resulting spot pattern 186 formed on the workpiece surface 402 by the pulsed laser beam 172.

Figure 7:
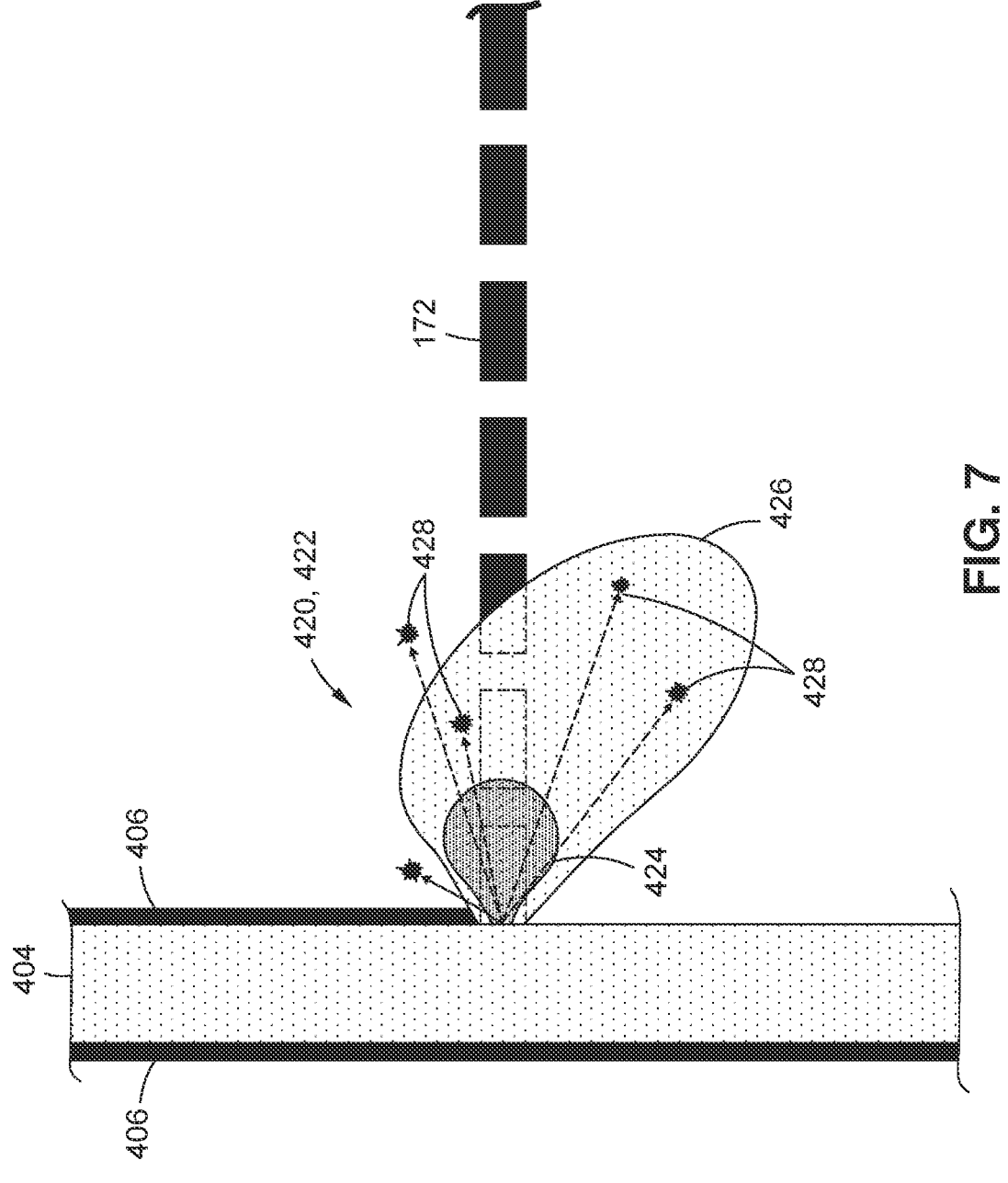
FIG. 7 is a top sectional view of the workpiece of FIG. 6 configured as a composite panel having opposing resin caps as the workpiece surfaces, and illustrating an example of the contaminants generated when a laser beam pulse impinges on the composite panel for removing (e.g., ablating) a thin layer of one of the resin caps.

FIG. 7 is a sectional view of a composite panel 404 having a composite substrate sandwiched between a pair of resin caps 406. The composite panel 404 may comprise cured fiber-reinforced polymer matrix material (e.g., carbon-epoxy composite). For processing composite workpieces, the laser source 150 (FIG. 9) is preferably an ultraviolet (UV) laser source configured to emit a UV laser beam, as described below. Each laser beam 172 pulse ablates a thin layer of the resin cap 406 (e.g., 2 microns), resulting in a textured or roughened surface that promotes the adhesion of a subsequently-applied coating material (e.g., paint), while leaving the underlying composite substrate intact.

Also shown in FIG. 7 is an example of the contaminants 420 that are generated when a laser beam 172 pulse impinges on the composite panel 404. As each laser beam 172 pulse impinges the workpiece surface 402 (i.e., the resin cap 406), effluent 422 is generated, as mentioned above. The effluent 422 (i.e., contaminants 420) includes a plasma plume 424, gasses and volatile organic compounds 426 (e.g., CO, $CO_2$, formaldehyde, etc.), and/or partially-combusted solid particles 428 and fumes. The airflow sheets 206 (FIG. 4) and air wedges 210 (FIG. 4) generated by the air knives 200 (FIG. 4) clear the effluent 422 (e.g., plasma plume 424, gasses, fumes, etc.) prior to arrival of the next laser beam 172 pulse on the workpiece surface 402. By blowing the contaminants 420 away, the air knives 200 avoid the occurrence of laser shielding, in which the effluent 422 otherwise impedes, dilutes, and/or blocks the energy (e.g., up to 80 percent) of the laser beam 172 pulses.

Figure 18:
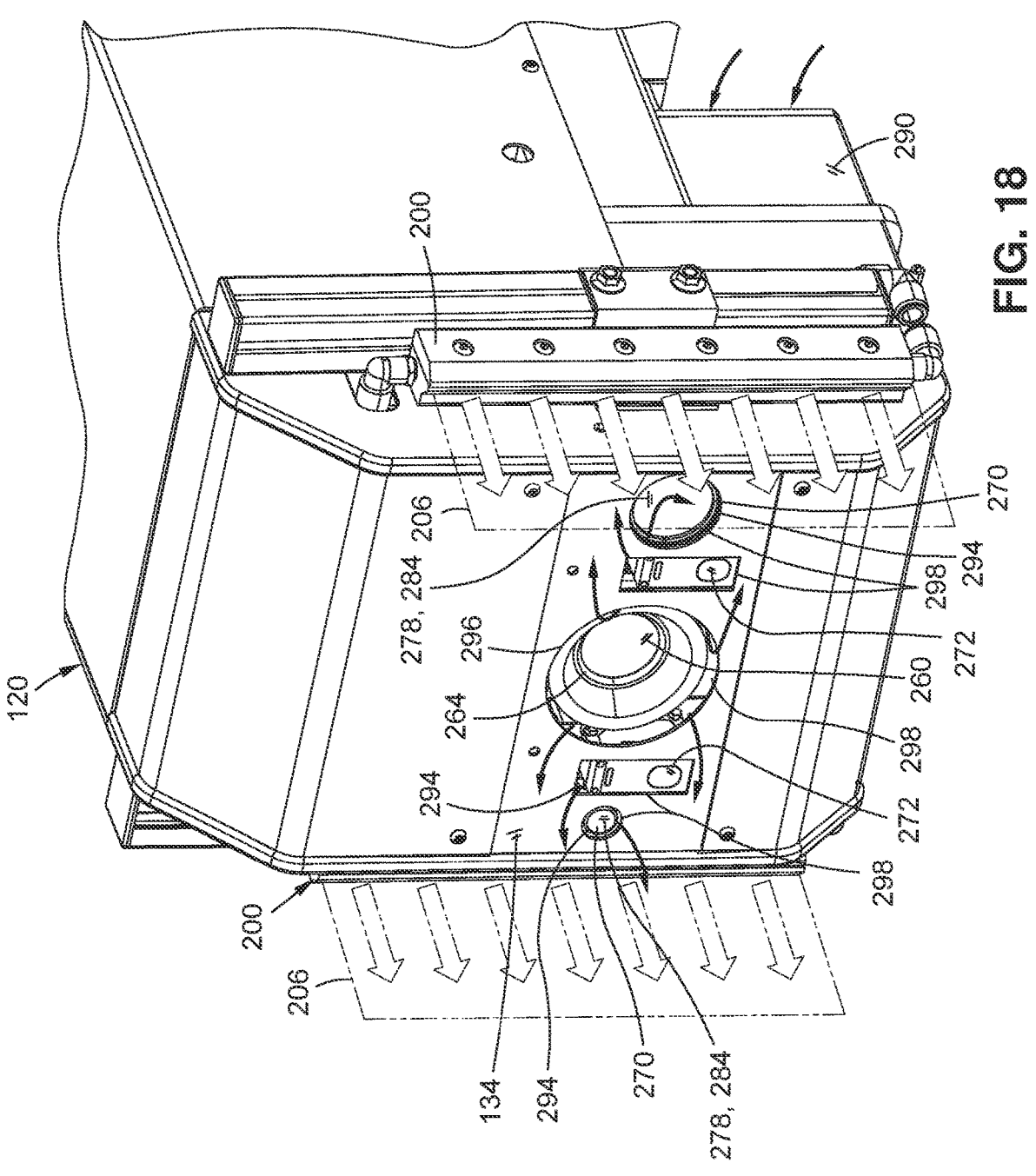
FIG. 18 is an enlarged perspective view of the laser module illustrating the air sheets discharged by the air knives for drawing ambient air out of the sensor housing through the air gaps between the sensors and the faceplate.
Figure 19:
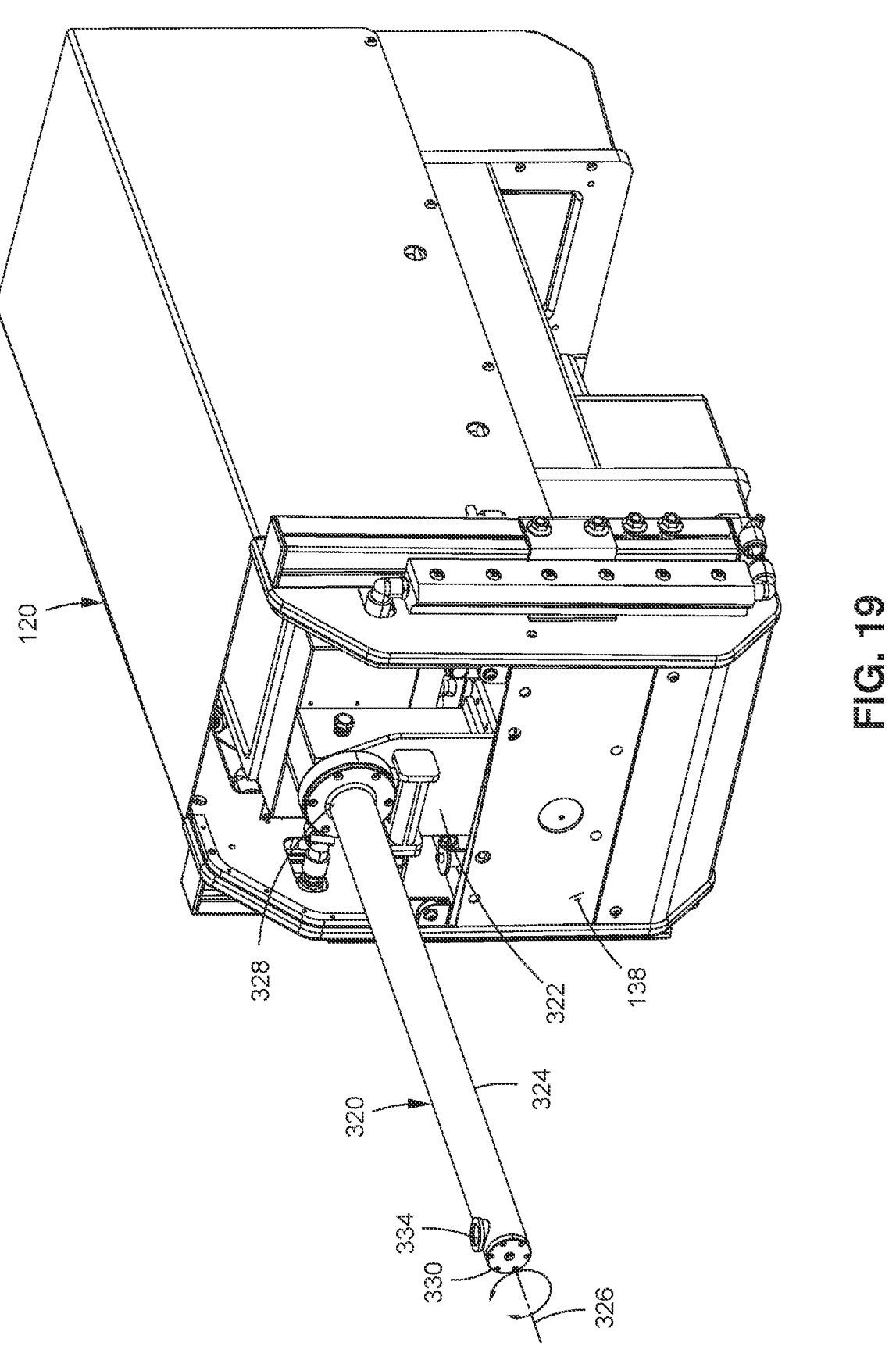
FIG. 19 is a perspective view of a further example of a laser module having a tubular lance assembly installed in place of the beam conditioning module.

In addition to blowing effluent 422 or contaminants 420 away from the scan field 182, the airflow sheets 206 or air wedges 210 also blow away the partially-combusted solid particles 428 that pop off of the workpiece surface 402 at high velocity when the laser beam 172 pulse ablates the workpiece surface 402. By blowing away the partially-combusted solid particles 428, the airflow sheets 206 or air wedges 210 protect the scanner exit window 264 (FIG. 9) and the sensor windows 284 (FIG. 9) from damage that could otherwise occur if contacted by the partially-combusted solid particles 428. Furthermore, the air knives 200 on opposite sides of the laser module 120 have the effect of entraining or drawing air out of air gaps 298 (FIG. 18) between the faceplate 134 (FIG. 18) and the laser scanner 260 (FIG. 18), and between the faceplate 134 and the sensors 270 (FIG. 18). By drawing air out of the sensor housing 290 (FIG. 18) via the air gaps 298, the air knives 200 assist in keeping the area in front of the sensors 270 and the laser scanner 260 clear of contaminants 420.

Figure 8:
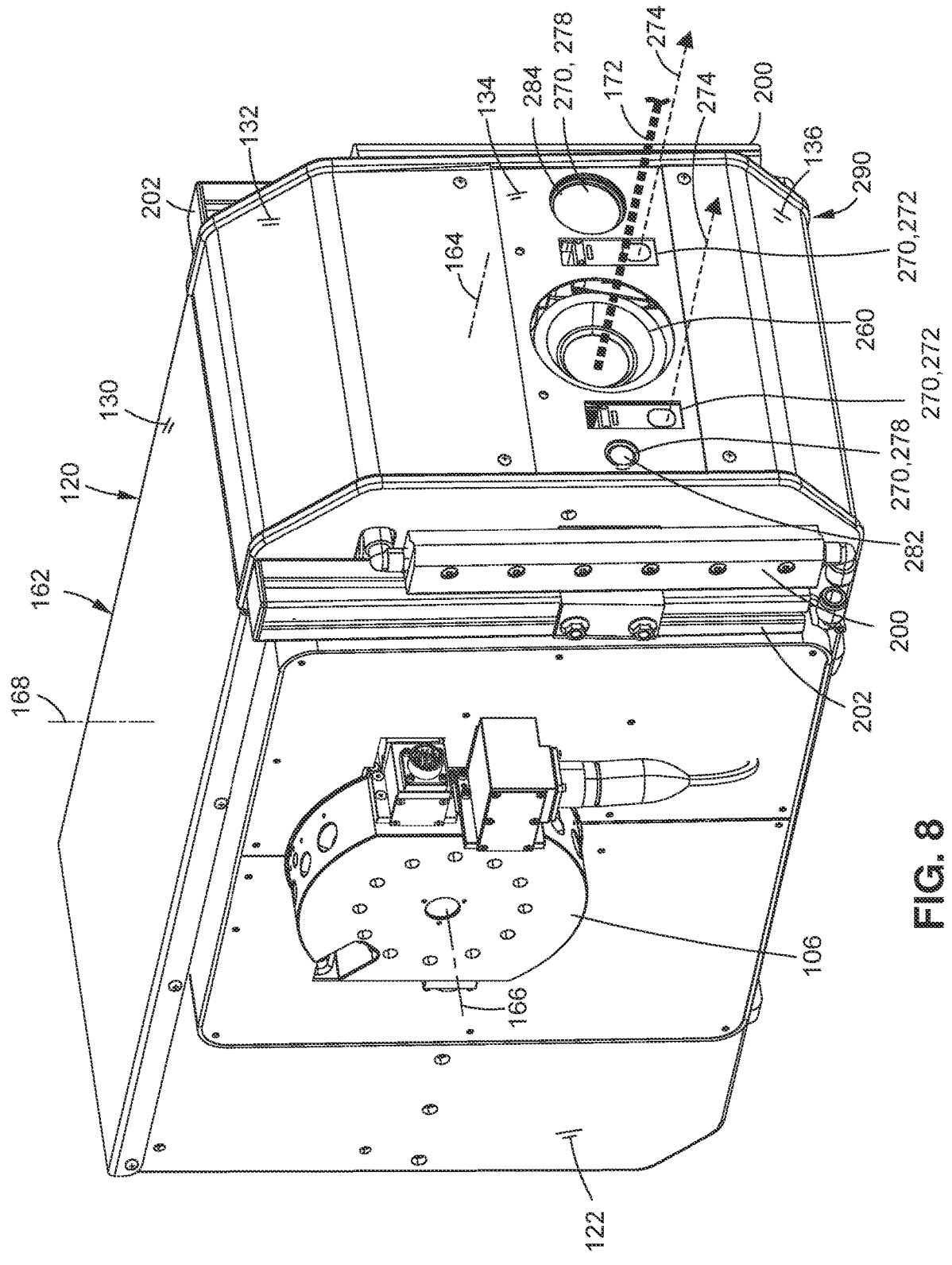
FIG. 8 is a front perspective view of an example of the laser module illustrating an arm-module interface for coupling the laser module to a robotic arm of the robotic device.

Referring to FIGS. 8-15, shown in FIG. 8 is an arm-module interface 106 on one side of the laser module 120, for coupling the laser module 120 to the robotic arm 102 (FIG. 1). Side coupling of the laser module 120 to the robotic arm 102 allows for a relatively wide range of motion for the laser module 120. In addition, side coupling of the laser module 120 to the robotic arm 102 allows for mounting the laser scanner 260 in an orientation such that the laser beam 172 is emitted from the laser scanner 260 in a forward direction, and parallel to the direction of the laser beam 172 emitted from the front end 152 of the laser source 150.

Figure 9:
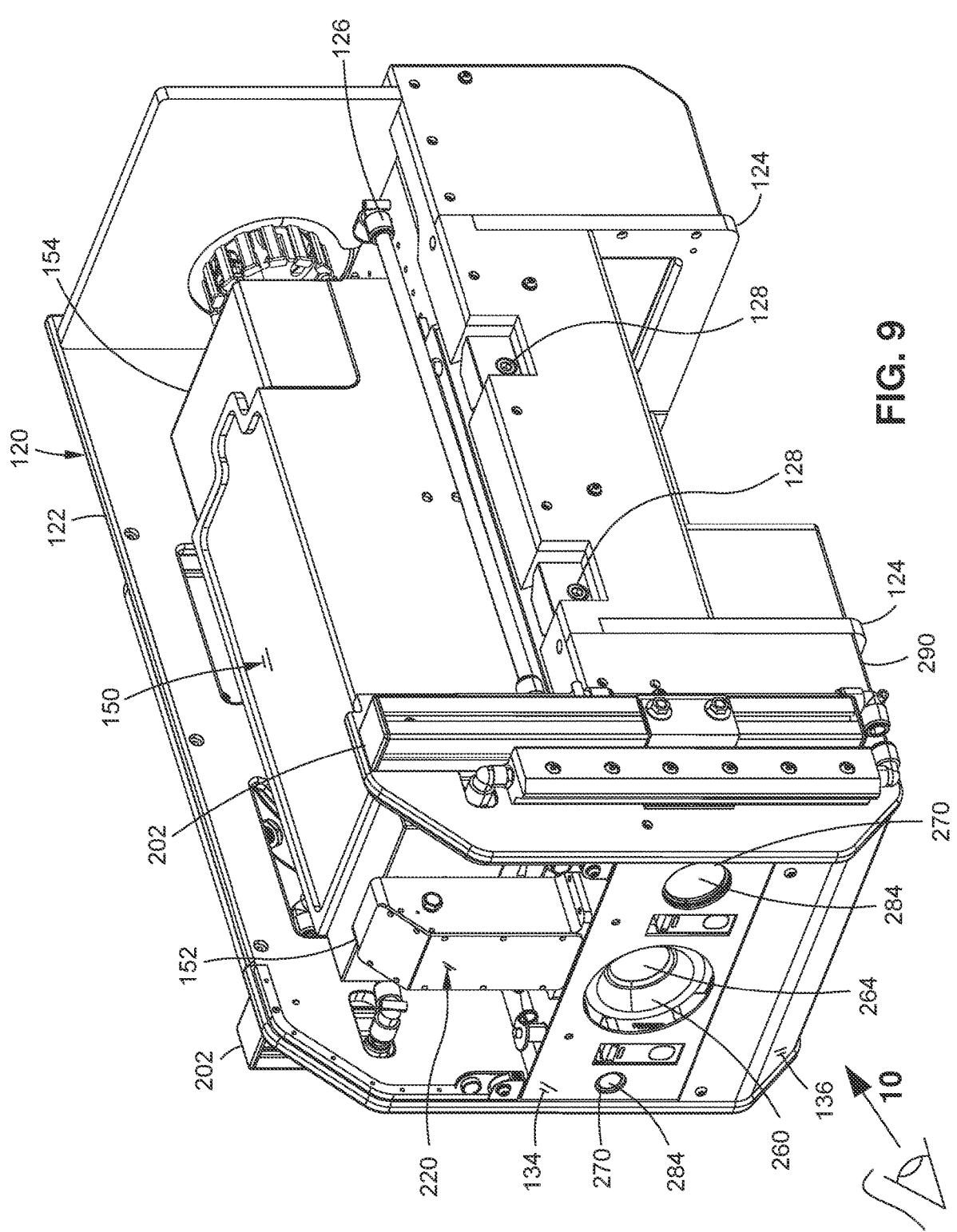
FIG. 9 is a further perspective view of an example of the laser module after removal of a main shroud and a front shroud, and illustrating a laser source and a beam conditioning module of the laser module.

In FIGS. 8-9, the arm-module interface 106 is shown coupled to a laser module mounting fixture 122, which is a structurally rigid assembly comprised of frame members 124, a base plate 126 (FIG. 13), mounting rails 202, a main shroud 130, a front shroud 132, a faceplate 134, and a sensor shroud 136. The frame members 124 and the base plate 126 support the components of the laser module 120. For example, the laser source 150 and the beam conditioning module 220 are mounted on top of the base plate 126. The laser scanner 260 and the various sensors 270 are mounted to the underside of the base plate 126. The air knives 200 are supported by the mounting rails 202 coupled to opposite sides of the laser module mounting fixture 122. The main shroud 130 and the front shroud 132 are configured to at least partially enclosed the laser source 150 and the beam conditioning module 220, and may additionally enclose a laser power supply (not shown) and a scanner power supply (not shown) at the back end 154 of the laser module 120. The faceplate 134 and the sensor shroud 136 complete the enclosure of the sensor housing 290 containing the laser scanner 260, and the sensors 270, including the imaging devices 278 and the displacement sensors 272, all of which are mounted underneath the base plate 126.

FIG. 9 shows the laser module 120 after removal of the main shroud 130 (FIG. 8) and the front shroud 132 (FIG. 8). The laser module mounting fixture 122 includes quick-release fixtures 128 securing the base plate 126 to the frame members 124. The quick-release fixtures 128 allow for quick separation of the base plate 126 (e.g., FIG. 13) from the remainder of the laser module mounting fixture 122 by sliding the base plate 126 forward and out of the laser module mounting fixture 122. In this manner, the quick-release fixtures 128 allow for quick access to the laser source 150, the beam conditioning module 220, the laser scanner 260, and other components, to facilitate maintenance, repair and replacement of such components.

Figure 11:
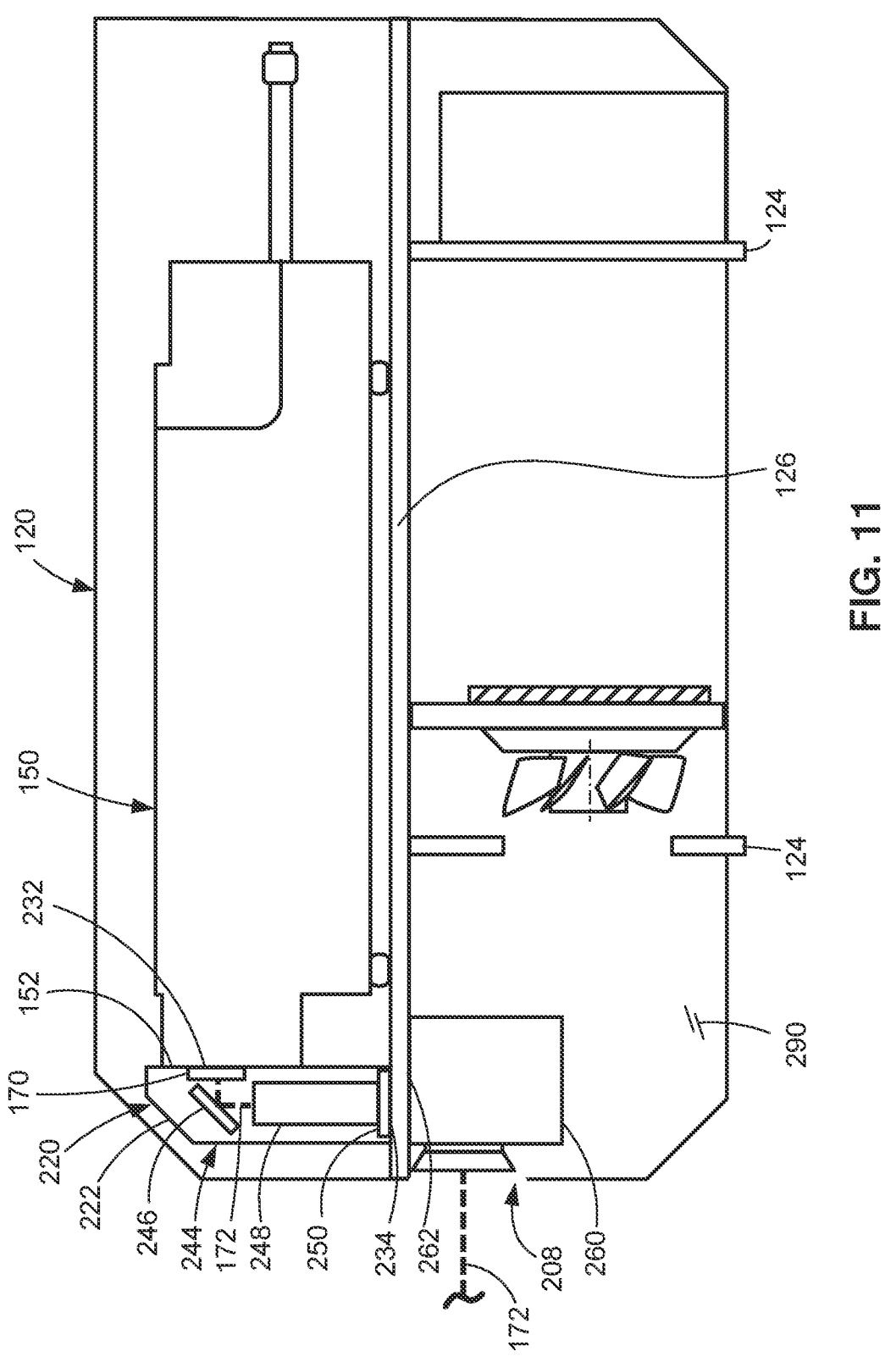
FIG. 11 is a side schematic illustration of the example of the laser module showing the laser source emitting the laser beam, which in turn is reflected by a conditioning module turning mirror, and redirected into a beam expander and a fixed focus lens, which in turn direct the laser beam into the laser scanner, which emits the laser beam in the same direction as the laser source.

Referring to FIGS. 9, 11, and 13, shown is an example of the laser module 120 with some of the shrouds removed to illustrate the laser source 150. In the present disclosure, the laser source 150 may be provided in any one of a variety of configurations, and may be configured to emit a laser beam 172 in any range of wavelengths. In one example, the laser source 150 may be provided as an infrared (IR) laser source configured to emit an IR laser beam. In applications involving the removal of coatings such as removing paint from a workpiece surface 402, an IR laser source may be selected for generating an IR laser beam of a wavelength of 1060-1080 nm, and preferably a wavelength of 1064 nm. In applications involving surface preparation of composite workpieces such as a composite panel 404, the laser source 150 is preferably an ultraviolet (UV) laser source configured to emit a UV laser beam, preferably having a wavelength in the range of 330-390 nm. In the example shown in the figures, the laser source 150 is a solid state UV laser identified as an Avia NX 355 nm Laser, commercially available from Coherent, Inc., of Santa Clara, Calif., and capable of emitting laser beam 172 pulses at a pulse frequency of 50-250 kHz, and generating up to 55 W of laser power. However, any one of a variety of different types of laser sources may be used in the laser module 120.

Referring to FIGS. 2, 4, and 8, shown is an X-axis 164, a Y-axis 166 and a Z-axis 168 of the laser module 120. The laser module 120 has the above-mentioned front end 152

(FIG. 4) and back end 154 (FIG. 4), and additionally includes a top side 156, a bottom side 158, and opposing lateral sides 160. The X-axis 164, the Y-axis 166 and the Z-axis 168 are mutually orthogonal to each other. The X-axis 164 is oriented parallel to the direction of the laser beam 172 emitted by the laser source 150, and extends between the front end 152 and the back end 154 of the laser source 150. The Y-axis 166 extends between the opposing lateral sides 160. The Z-axis 168 extends between the top side 156 and the bottom side 158. When the laser module 120 is in an upright orientation 162, the Z-axis 168 is vertically oriented, and the X-axis 164 and Y-axis 166 are both horizontally oriented.

For configurations of the laser module 120 having a UV laser source, the robot controller 104 (FIG. 9) of the robotic device 100 is configured such that when the laser beam 172 is emitted, the laser module 120 and UV laser source are maintained in a substantially upright orientation 162. For example, starting from the upright orientation 162, the robot controller 104 is configured to limit rotation of the laser module 120 about the X-axis 164 to more than 90 degrees in either direction (i.e., side-to-side rotation). In addition, starting from the upright orientation 162, the robot controller 104 is configured to limit rotation of the laser module 120 about the Y-axis 166 to no more than 90 degrees in either direction (i.e., end-to-end rotation). Advantageously, by limiting rotation of the UV laser source from the upright orientation 162 to no more than 90 degrees in either direction about the X-axis 164 or Y-axis 166, the power of the UV laser source is maintained to within 90 percent of the power when the UV laser source is in the upright orientation 162. The above-noted limitations on rotation of the UV laser source about the X-axis 164 and Y-axis 166 apply to any laser module 120 configuration disclosed herein, including configurations that lack air knives 200, configurations that lack other presently-disclosed components of the laser module 120, and configurations that include the below-described lance assembly 320.

FIGS. 8-15 show the beam conditioning module 220, the laser scanner 260, the displacement sensors 272, and the imaging devices 278. The laser scanner 260, the displacement sensors 272, and the imaging devices 278 are contained within the sensor housing 290, which is located below the beam conditioning module 220. The laser scanner 260 directs the movement of the laser beam 172 along the workpiece surface 402, as mentioned above. The displacement sensors 272 measure the actual standoff distance 276 (FIG. 4) between the laser module 120 and the workpiece surface 402. The imaging devices 278 (e.g., cameras) record images of the workpiece surface 402 for monitoring and recording the progress of the laser beam 172 in processing the workpiece surface 402.

The beam conditioning module 220 receives the laser beam 172 from a laser source output window 170, which is mounted to the front end 152 of the laser source 150. The beam conditioning module 220 includes a beam conditioning module housing 222, which is configured to contain a conditioning module turning mirror 246, a beam expander 248, and a fixed focus lens 250. The beam conditioning module housing 222 includes a housing input aperture 232 (FIG. 11) formed in a back wall (not shown) of the beam conditioning module housing 222. The housing input aperture 232 is sized and configured to receive the laser source output window 170, and seals the laser source output window 170 inside the beam conditioning module 220 to protect the laser source output window 170 from contaminants. The beam conditioning module housing 222 may be comprised of metallic material (e.g., aluminum) that is bare (i.e., uncoated) on its internal surfaces to promote a contamination-free environment within the conditioning module housing 222. A housing exit aperture 234 is formed in a bottom wall of the conditioning module housing 222, which is sealed (e.g., via an O-ring) to the base plate 126 of the laser module mounting fixture 122. The base plate 126 includes a hole (not shown) that is aligned with the housing exit aperture 234. The housing exit aperture 234 is aligned with a scanner entrance 262 of the laser scanner 260 to allow for entry of the laser beam 172 into the laser scanner 260.

Figures 14, 15:
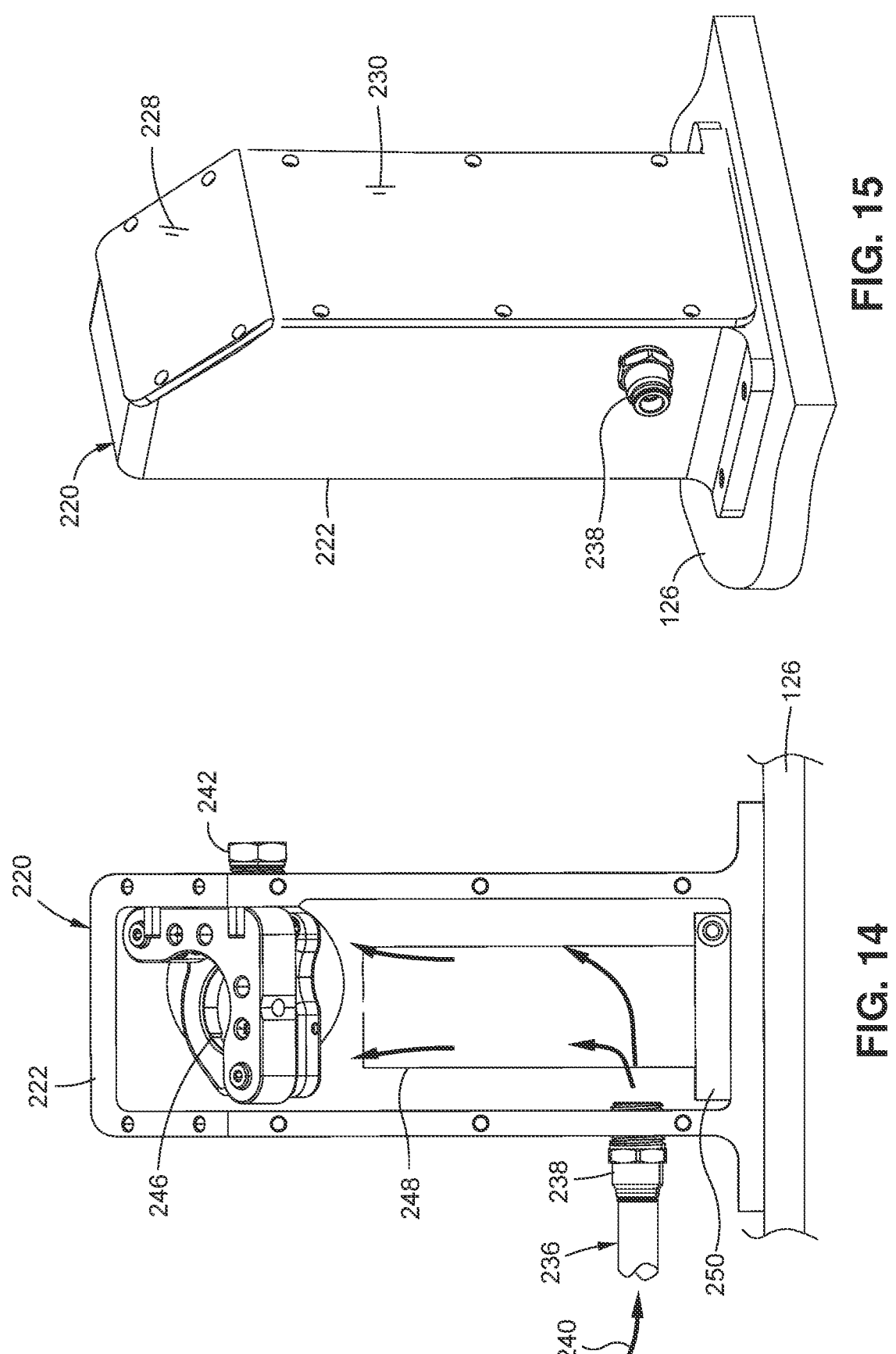
FIG. 14 is a front view of an example of the beam conditioning module after removal of a module front cover and a module top cover, and illustrating the injection of gas to positively pressurize the conditioning module housing to thereby prevent entry of the contaminants into the conditioning module housing during processing of the workpiece surface.
FIG. 15 is a side perspective view of the beam conditioning module of FIG. 14 with the module front cover and module top cover installed.

Referring briefly to FIGS. 14-15, the conditioning module housing 222 includes a conditioning module purge system 236, comprising a module injection port 238 for injecting gas 240 into the conditioning module housing 222. The gas 240 may be clean and dry air, or the gas 240 may be an inert gas, such as ultra-high purity nitrogen gas. The injection of the gas 240 positively pressurizes the beam conditioning module 220, and thereby prevents contaminants 420 (FIG. 7) from entering the conditioning module housing 222 and contaminating the laser optical equipment 244, such as the laser source output window 170 (FIG. 13), the conditioning module turning mirror 246 (FIG. 13), the beam expander 248 (FIG. 13), and the fixed focus lens 250 (FIG. 13). The conditioning module housing 222 may further include a module exhaust port 242 (e.g., a breather fitting) for releasing excess gas pressure inside the conditioning module housing 222.

As shown in FIG. 11, the conditioning module turning mirror 246 is oriented at 45 degrees relative to the direction of the laser beam 172 from the laser source 150, and redirects the laser beam 172 downwardly into the beam expander 248, which is mounted upstream of the fixed focus lens 250 (if included) and upstream of the laser scanner 260. The beam expander 248 is configured to change the diameter of the laser beam 172, which is emitted by the laser source 150 as a collimated laser beam 172. Depending on its beam expansion number, the beam expander 248 is configured to increase or decrease the width (e.g., diameter) of the laser beam 172 to achieve a desired spot size (e.g., spot diameter) of the laser spot 180 on the workpiece surface 402. The fixed focus lens 250 focuses the collimated laser beam 172 down to a desired size of the laser spot 180, which the laser scanner 260 directs onto the workpiece surface 402.

Each beam expander 248 includes two lenses (e.g., UV-coated lenses) housed within a tubular cartridge, including an input lens (not shown) and an output lens (not shown). In the present example, the tubular cartridge is a 3.5 inch-long raw (non-anodized) aluminum tube, although the tubular cartridge may be provided in any length and may be formed of alternative materials. The exterior of each tubular cartridge may include indicia indicating the beam expansion number, and may also include an arrow indicating the proper orientation of the beam expander 248 (e.g., downward toward the fixed focus lens 250) for installation inside the beam conditioning module 220.

For surface preparation of a composite workpiece, a 0.5× beam expander 248 includes an input lens of 150 mm focal length, and an output lens of 75 mm focal length, to result in a spot size of approximately 260 μm. However, beam expanders 248 may be provided in different beam expansion numbers (i.e., the factor by which the diameter is increased or decreased) by combining different sizes of the input and output lenses, including 125 mm, 100 mm, and other lens sizes. For example, a 2× beam expander 248 includes a 75 mm input lens and a 150 mm output lens to result in a spot size of approximately 65 μm. A 1.66× beam expander 248 includes a 125 mm input lens and a 75 mm output lens to result in a spot size of approximately 216 μm. A 0.6× beam expander 248 includes a 75 mm input lens and a 125 mm output lens to result in a spot size of approximately 78 μm. A 1.33× beam expander 248 includes a 100 mm input lens and a 75 mm output lens to result in a spot size of approximately 173 μm. A 0.75× beam expander 248 includes a 75 mm input lens and a 100 mm output lens to result in a spot size of approximately 98 μm. In some examples, the beam expander 248 may be omitted from the beam conditioning module 220, resulting in a spot size of approximately 130 μm using only the 1-meter fixed focus lens 250.

As shown in FIG. 13, the conditioning module housing 222 has a module top cover 228, which is removable to facilitate quick removal and replacement of the conditioning module turning mirror 246. In addition, the conditioning module housing 222 has a module front cover 230 to facilitate quick removal and replacement of the beam expander 248, and quick removal and replacement of the fixed focus lens 250. Like the beam expander 248, the fixed focus lens 250 can be provided in a variety of different sizes for achieving a desired size of the laser spot 180 on the workpiece surface 402. For example, if the collimated laser beam 172 emitted by the laser source 150 has a diameter of 3.5 mm, then a beam expander 248 having a beam expansion number of 2:1 will reduce the diameter of the laser beam 172 to 1.75 mm. A 1-meter fixed focus lens 250 will focus the 1.75 mm laser beam 172 down to a laser spot 1 meter away.

Figure 12:
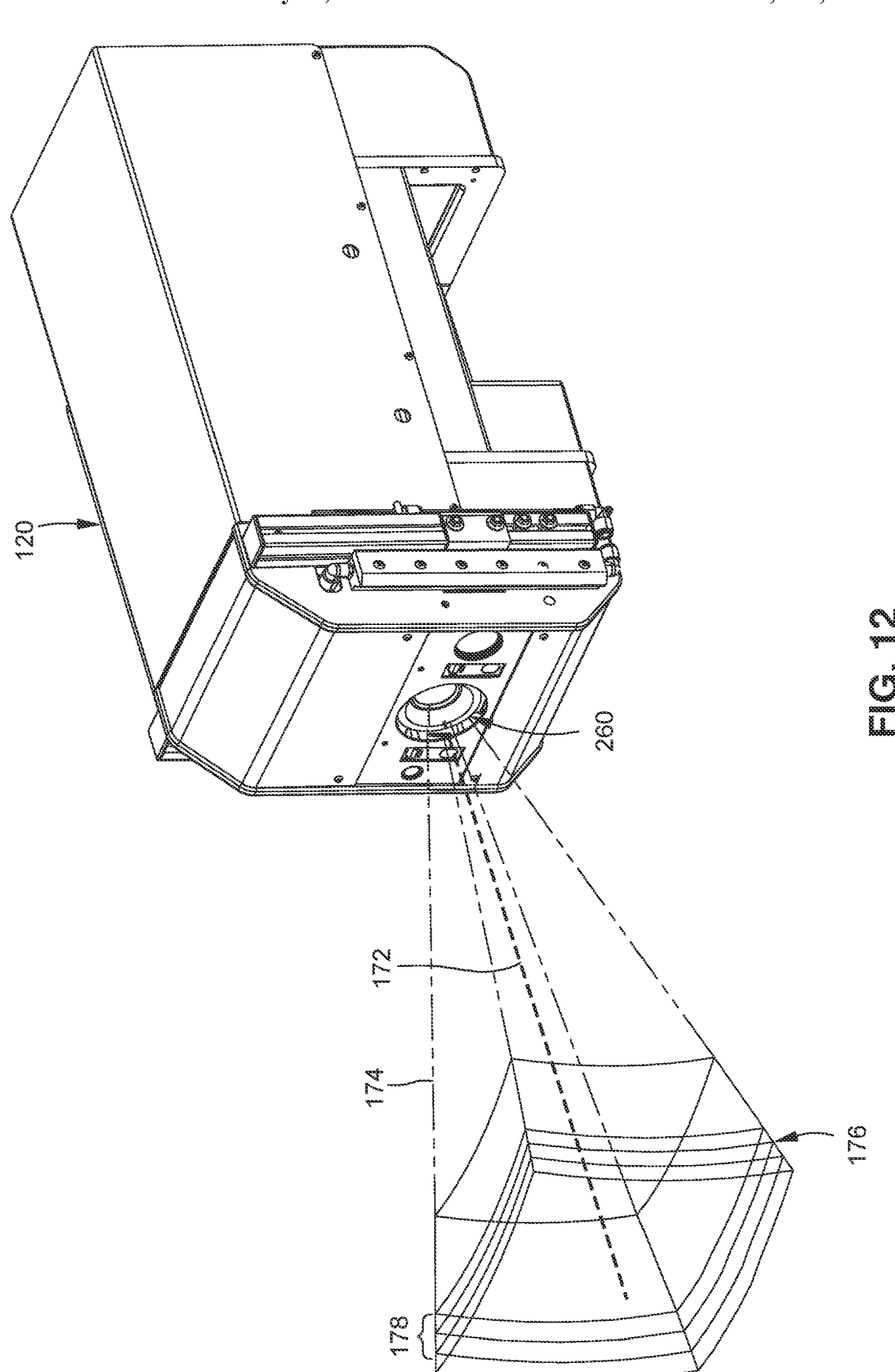
FIG. 12 is a perspective illustration of an example of the laser module illustrating an example of the laser field of view and the focal point or region of the laser beam.

Referring briefly to FIG. 12, shown is the laser module 120 and the laser field of view 174 provided by the laser scanner 260. Superimposed on the laser field of view 174 is the focal point 176 of the laser beam 172, and the beam waist or focal range 178 of the laser beam 172. Increasing the actual standoff distance 276 (FIG. 4) provides for a deeper beam waist (i.e., a longer focal range 178), which provides for a deeper working volume over which the laser beam 172 can effectively process the workpiece surface 402. In addition, the longer the actual standoff distance 276, the larger the scan field 182. Additionally, a longer standoff distance may be more effective in keeping the laser optical equipment 244 (FIG. 11) away from contaminants 420 (FIG. 7) or effluent 422 (FIG. 7) generated when the laser beam 172 impinges the workpiece surface 402. However, a longer standoff distance also increases the effective length of the laser end effector, which may be described as the combined length of the standoff distance and the length of the laser module 120. For certain workpiece configurations (e.g., having a small radius of curvature), an excessively long laser end effector may present challenges in positioning the laser module 120 in a manner allowing the laser beam 172 to access the workpiece surfaces 402. Furthermore, a longer standoff distance can reduce the accuracy with which the laser spot 180 is located on the workpiece surface 402, which may be important for precision operations such as laser drilling and laser machining. Even further, mechanical vibration may have a significant effect on the stability of the laser spot 180 at relatively long standoff distances.

As may be appreciated, the laser optical equipment 244 and the laser source 150 parameters must be optimized for each type of application or operation. For laser ablation, the irradiance of the laser beam 172 is an important parameter. In addition, the energy density at the laser spot 180 must be high enough to overcome the mechanical and chemical bonds of the workpiece material to allow for ablation of the workpiece surface 402. The required magnitude of irradiance is dictated in part by the material composition of the workpiece surface 402. Providing the required amount of irradiance to successfully ablate a thin layer of the workpiece surface 402 may be achieved in several different ways, such as by increasing the average laser power, reducing the pulse duration, and/or reducing the diameter of the laser spot 180.

Referring to FIGS. 8-13, as mentioned above, the laser scanner 260 receives the laser beam 172 from the beam conditioning module 220, and emits the laser beam 172 from the scanner exit window 264 while scanning the laser beam 172 over the workpiece surface 402. In the example shown, the laser scanner 260 is identified as a ScanCube III, commercially available from ScanLab GmbH, Germany. However, any one of a variety of different types of laser scanners may be used in the laser module 120.

Referring to FIG. 13, some examples of the laser module 120 may omit the fixed focus lens 250 from the beam conditioning module 220. An F-theta lens 266 can be installed on the laser scanner 260 as a means for focusing the laser beam 172 to a laser spot 180. Advantageously, an F-theta lens 266 allows for a substantially constant spot size at any location within the scan field 182. The F-theta lens 266 may be UV-coated, and can be threadably engaged to the front end 152 of the laser scanner 260. F-theta lenses 266 are available in different sizes, and are selected to achieve a desired spot size on the workpiece surface 402. An F-theta lens 266 can be used in combination with a beam expander 248 to increase or decrease the spot size. For a laser source 150 emitting a 3.5 mm diameter laser beam 172, an F-theta lens 266 having a focal length of 103 mm results in a spot size of 25 μm without a beam expander 248, and a spot size of 12 μm with a 2× beam expander 248. The focus distance for a 103 mm F-theta lens 266 is 135 mm from the end of the F-theta lens 266. In another example, a 250 mm F-theta lens 266 results in a spot size of 45 μm without a 2× beam expander 248, and a spot size of 22 μm with a 2× beam expander 248. A 350 mm F-theta lens 266 results in a spot size of 56 μm without a 2× beam expander 248, and a spot size of 28 μm with a 2× beam expander 248.

Referring briefly to FIGS. 3-4 and 8-10, as mentioned above, the laser module 120 may include one or more displacement sensors 272, each configured to emit a sensor laser beam 274 (e.g., a laser) for measuring the actual standoff distance 276 between the laser module 120 and the workpiece surface 402. Actual standoff distance 276 measurements from the displacement sensors 272 are used for adjusting both the spatial location and the spatial orientation of the laser module 120 relative to the workpiece surface 402, as described in greater detail below. Upon command, such as when the robotic arm 102 initially moves the laser module 120 into position for processing a workpiece surface 402, the displacement sensors 272 can transmit standoff distance measurements to the robotic device 100 for adjusting the location of the laser module 120 to maintain the actual standoff distance 276 to within a predetermined tolerance of a nominal standoff distance.

In addition to measuring actual standoff distance 276, at least two of the displacement sensors 272 may be operated in a coordinated manner to establish the orientation of the laser beam 172 relative to the workpiece surface 402. The displacement sensors 272 in the figures are spaced apart from each other on opposite sides of the laser scanner 260. Each displacement sensor transmits standoff distance measurements to the robotic device 100 for adjusting the orientation of the laser module 120 to maintain the laser beam 172 within a predetermined tolerance of an orientation that is normal (i.e., locally perpendicular) to the workpiece surface 402. In the example shown, the displacement sensors 272 are identified as Keyence IL600 Sensors, commercially available from Keyence Corporation of America, of Itasca, Ill. However, any one of a variety of different types of displacement sensors may be used for measuring the actual standoff distance 276.

Figure 10:
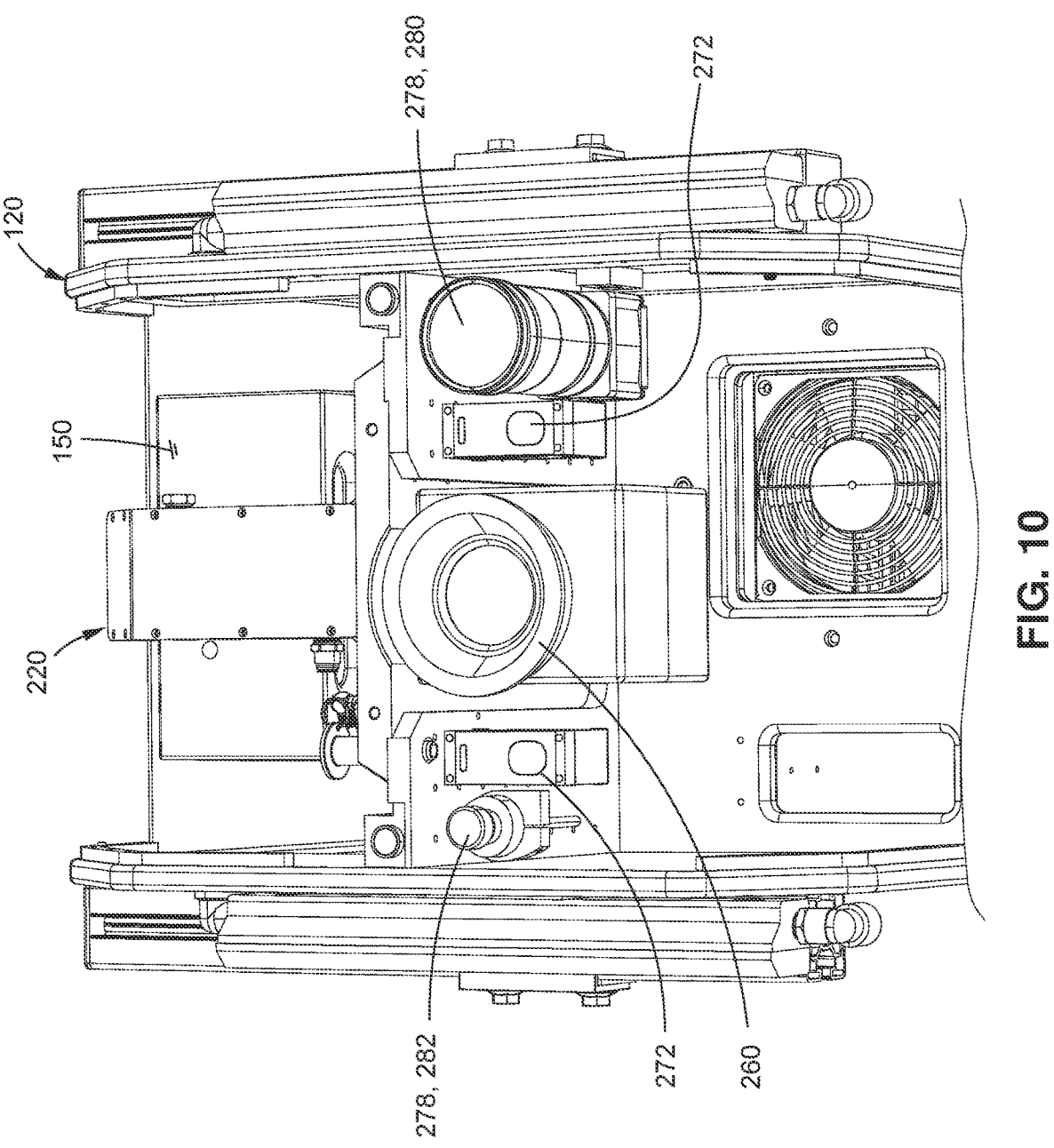
FIG. 10 is a bottom-up perspective view of the laser module taken along line 10 of FIG. 9, and in which a sensor shroud has been removed to illustrate a laser scanner and several sensors of the laser module.

Referring to FIG. 10, the laser module 120 may include at least one imaging device 278 configured to record images of the workpiece surface 402. For example, the figures show two imaging devices 278 respectively mounted on opposite sides of the laser scanner 260. One of the imaging device 278 is a high-definition camera 282 configured to record images of the workpiece surface 402 to allow for visual monitoring, by a technician, of the processing of the workpiece surface 402 by the laser beam 172. The images recorded by the high-definition camera 282 may be still images or video, and may be transmitted to a display monitor 372 such as of a desktop computer or a laptop computer 374 (FIG. 1) to allow for visual monitoring of the workpiece surface 402 during processing by the laser beam 172. The high-definition camera 282 is a relatively small, power-over-ethernet (POE) camera that has a fish-eye lens that allows a technician to see what the laser module 120 is facing. For example, the high-definition camera 282 (e.g., 2 megapixel) is capable of imaging the entire scan field and the surrounding area. The high-definition camera 282 shown in the figures provides a 1080p video stream that is transmitted to a digital video recorder (not shown) housed within the cabinet 360 (FIG. 1), and is commercially available from Axis Communications, Inc., of Lund, Sweden, and identified as a model F1015 Sensor Unit.

Also shown in FIG. 10 is a machine vision camera 280 configured to record images of the workpiece surface 402, and transmit images to a processor 370 (FIG. 1) for any one or more of a variety of purposes. In the figures, the machine vision camera 280 is also a POE camera (e.g., 9 megapixel) identified as model number GV-5290FA, commercially available from Imaging Development Systems, Inc., of Stoneham, Massachussetts. The machine vision camera 280 is fitted with a 16 mm lens, identified as model number M111FM16, and commercially available from Tamron USA, Inc. of Commack, New York. The machine vision camera 280 has a slightly larger field of view than the scan field 182, and is aligned with the laser scanner 260.

The images recorded by the machine vision camera 280 may be used for determining the location and orientation of the workpiece 400 within a manufacturing cell (not shown) containing the laser module 120. In another example, the images recorded by the machine vision camera 280 may be used for determining the location of features (e.g., holes, components) of the workpiece 400 relative to each other. In a still further example, the images recorded by the machine vision camera 280 may be used for monitoring the effectiveness of the laser beam 172 in processing the workpiece 400, determining whether the workpiece 400 is being processed within process tolerances, and generating a quality assurance record to confirm that the laser processing was performed within process tolerances. Even further, the images recorded by the machine vision camera 280 may be used for calibrating the laser scanner 260, and calibrating the tool center point (not shown) of the robotic arm 102.

Figure 16:
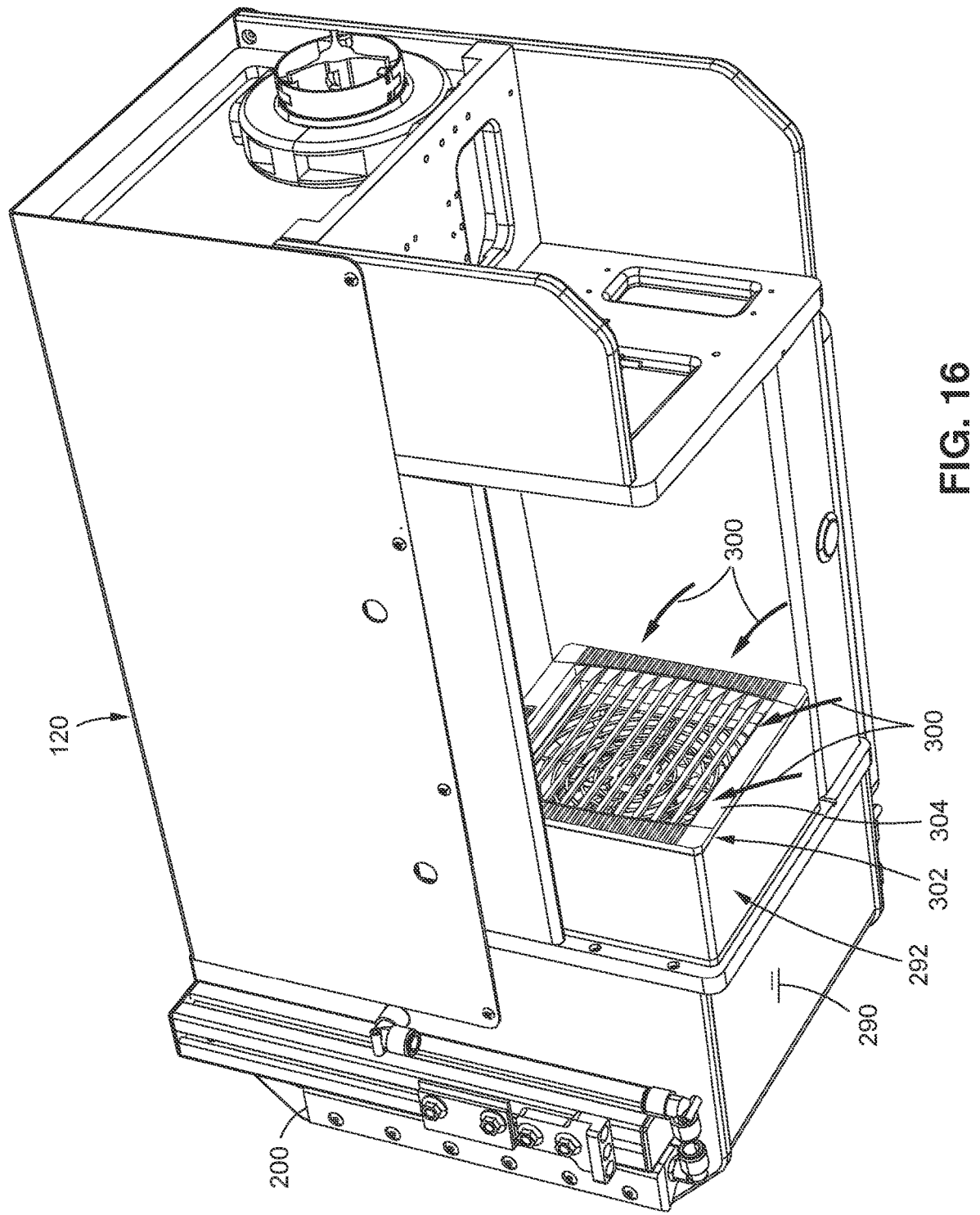
FIG. 16 is a bottom-up perspective view of an example of the laser module illustrating ambient air being drawn into a sensor housing containing the laser scanner and various sensors.
Figure 17:
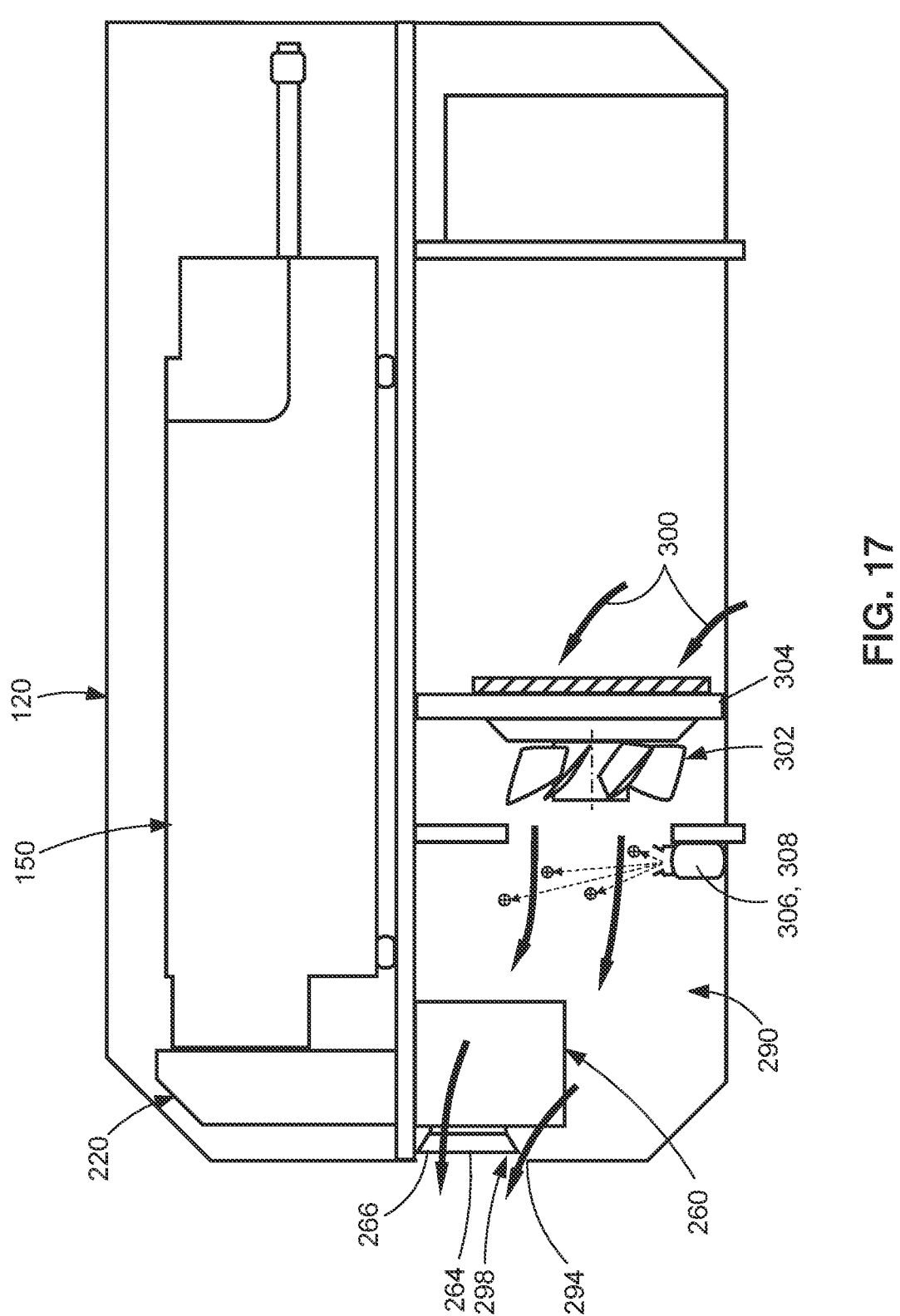
FIG. 17 is a side schematic illustration of the laser module of FIG. 16 illustrating a fan drawing ambient air into the sensor housing, and further illustrating the ambient air exhausting through air gaps formed between the sensors and a faceplate of the laser module.

Referring to FIGS. 16-18, as mentioned above, the laser module 120 includes a sensor housing 290 containing the laser scanner 260 and other sensors 270, such as the imaging devices 278 (e.g., cameras) and the displacement sensors 272. The laser scanner 260 has the above-mentioned scanner exit window 264, and each of the sensors 270 has a sensor window 284. As mentioned above, the sensor housing 290 is partially enclosed by the faceplate 134, which has a sensor window cutout 294 for each of the sensor windows 284. In addition, the faceplate 134 includes a scanner window cutout 296 for the scanner exit window 264. The scanner window cutout 296 is sized to provide an air gap 298 between the scanner exit window 264 and the faceplate 134. Similarly, the sensor window cutouts 294 are each sized to provide an air gap 298 between the sensor windows 284 and the faceplate 134.

In the example shown, the laser module 120 additionally includes a fan 302 located at the aft end of the sensor housing 290. The fan 302 is configured to draw a high volume of ambient air 300 into the sensor housing 290. The fan 302 may include a pre-filter 304 for filtering airborne particles and fumes from the ambient air 300. The fan 302, the scanner window cutout 296, and the sensor window cutouts 294 collectively form the sensor housing purge system 292. The filtered air that is drawn into the sensor housing 290 via the fan 302 is discharged out of the sensor housing 290 through the air gaps 298 in the faceplate 134. The air flowing out of the air gaps 298 keeps contaminants 420 (e.g., fumes, particles, etc.) away from the scanner exit window 264 and the sensor windows 284. As mentioned above, the air knives 200 on opposite sides of the laser module 120 have the effect of entraining the air flowing out of the air gaps 298, thereby assisting in keeping the area in front of the laser scanner 260 and the sensors 270 clear of contaminants 420 that may otherwise impede, dilute and/or partially block the laser beam 172 and obstruct the line-of-sight from the imaging devices 278 and displacement sensors 272 to the workpiece surface 402.

Referring to FIG. 17, some examples of the laser module 120 may include a de-ionizing system 306 configured to release ions into the regions proximate the workpiece surface 402 and/or proximate the laser module 120. Such a de-ionizing system 306 neutralizes static buildup on the workpiece surface 402 and the sensor windows 284. In the example shown, the de-ionizing system 306 comprises a de-ionizing bar 308 mounted inside the sensor housing 290 adjacent to the fan 302. Depending upon the polarity of charge buildup, the de-ionizing bar 308 is configured to release positive ions or negative ions to prevent airborne particles (e.g., contaminants 420) from being attracted to the scanner exit window 264 and the sensor windows 284. Alternatively or additionally, the air knives 200 can be provided as ionizing air knives 200 configured to release ions into the airflow sheets 206 of compressed air, as a means to neutralize static buildup on workpieces 400 that are not well-grounded, and thereby avoid the buildup of contamination on the workpiece surface 402.

Figure 20:
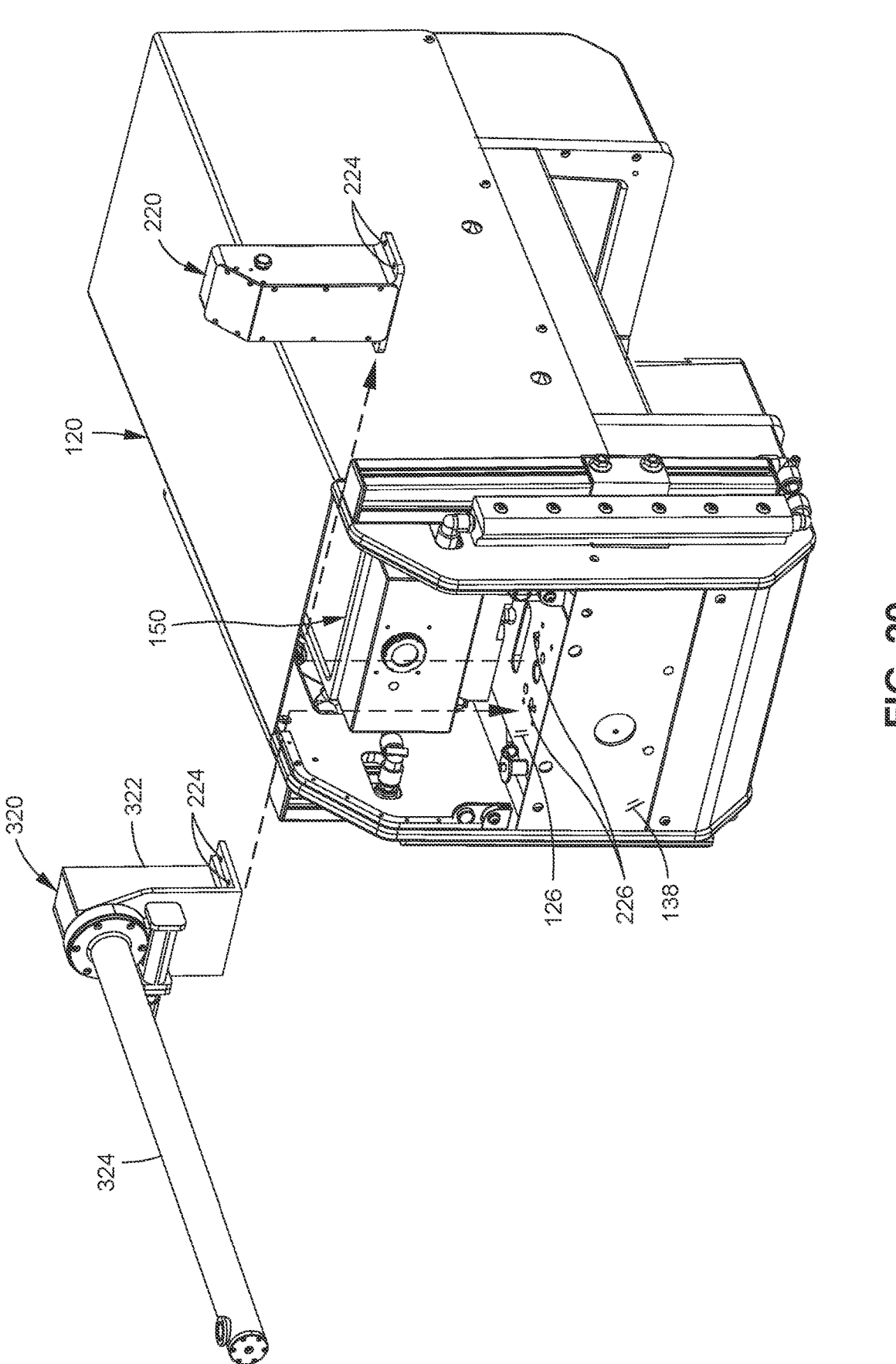
FIG. 20 is a partially exploded view of the laser module of FIG. 19 after removal of the beam conditioning module, and prior to installation of the lance assembly using the same fastener pattern as the beam conditioning module.
Figure 21:
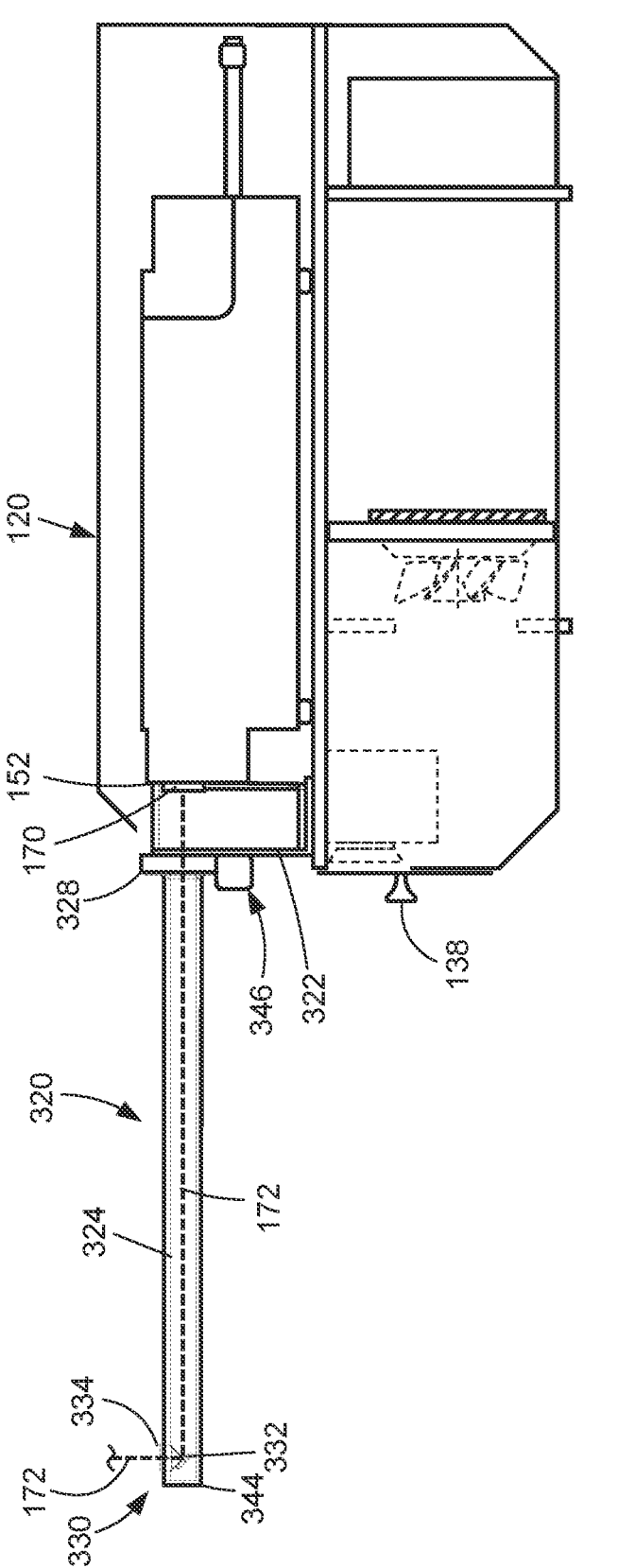
FIG. 21 is a side schematic view of the example of the laser module of FIGS. 19-20, and illustrating the laser source emitting the laser beam into the tubular lance, and further illustrating the laser beam directed radially outwardly through a lance aperture via a lance turning mirror housed within a lance distal end of the tubular lance.

Referring now FIGS. 19-27, shown is an example of a laser module 120 having a lance assembly 320 installed in place of the beam conditioning module 220. As shown in FIG. 21, a removable sensor cover 138 is installed to cover the scanner exit window 264 (i.e., F-theta lens 266) and the sensor windows 284. The lance assembly 320 includes a tubular lance 324, which has a lance proximal end 328 and a lance distal end 330. The lance distal end 330 houses a lance turning mirror 332, and has a lance aperture 334 formed in the wall of the tubular lance 324. The lance aperture 334 may be covered by an aperture cover 336 of plastic or glass.

As shown in FIG. 20, the lance assembly 320 includes a lance mounting fixture 322 for coupling the lance assembly 320 to the base plate 126 of the laser module mounting fixture 122. The fastener pattern 224 for coupling the lance mounting fixture 322 to the base plate 126 may be identical to the fastener pattern 224 for coupling the beam conditioning module 220 to the base plate 126. In addition, the fastener pattern 224 may include alignment holes (not shown) configured to receive dowel pins 226 for quickly and accurately locating and orienting the lance assembly 320 relative to the laser source 150 so that the tubular lance 324 is aligned with the laser beam 172 (FIG. 21).

Figures 22, 23:
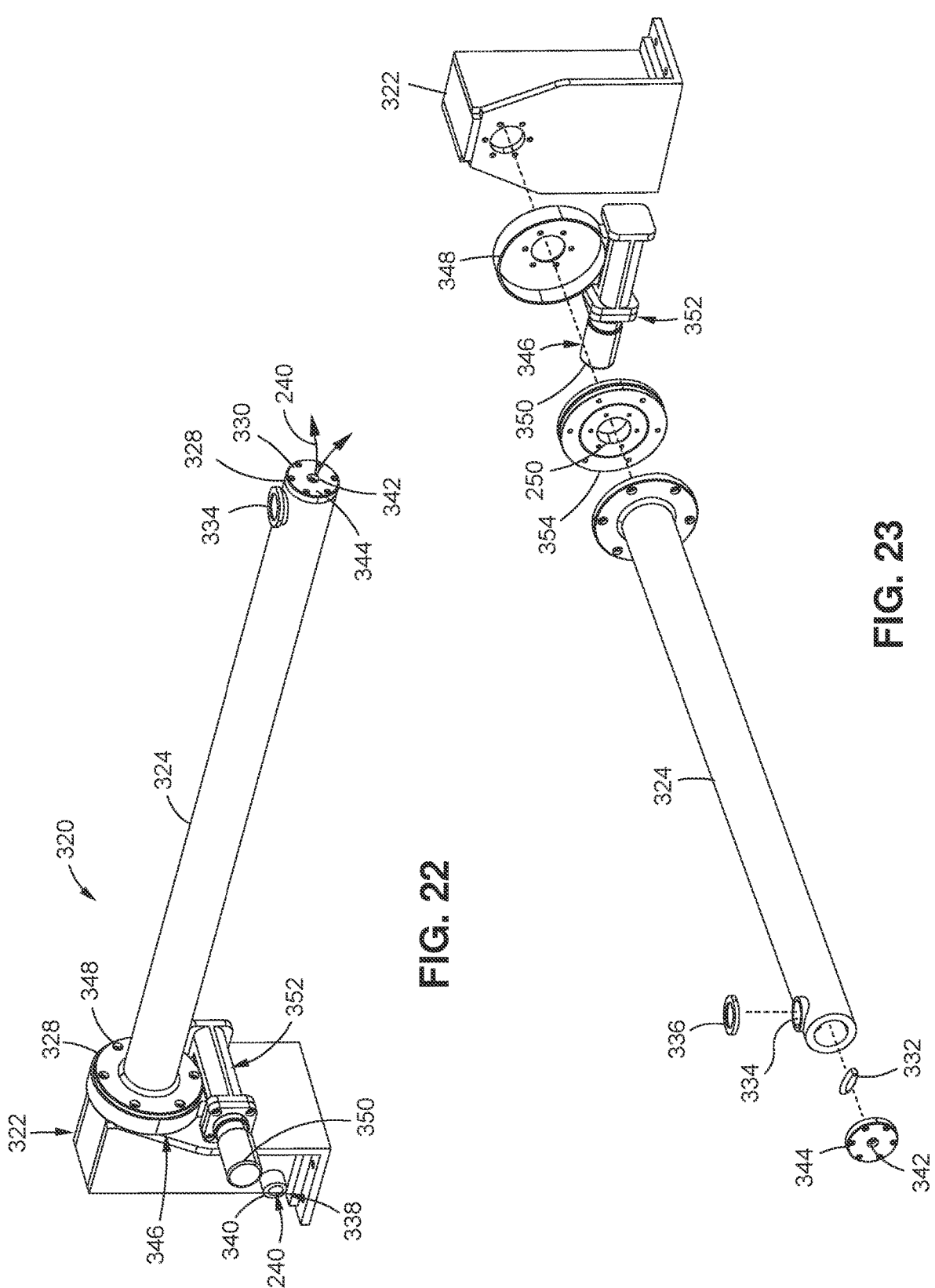
FIG. 22 is a perspective view of an example of the lance assembly showing the tubular lance supported by a lance mounting fixture, and having a rotary gear mechanism for rotating the tubular lance about a lance axis.
FIG. 23 is an exploded perspective view of the lance assembly of FIG. 22 showing the lance mounting fixture, the rotary gear mechanism, the tubular lance, the lance turning mirror, and the lance aperture.

As shown in FIGS. 21-23, the lance proximal end 328 of the tubular lance 324 is configured to receive the laser beam 172 from the front end 152 of the laser source 150. The lance mounting fixture 322 is configured to support a fixed focus lens 250 at the lance proximal end 328. Although not shown, the back wall of the lance mounting fixture 322 has a hole that is sized and configured to receive the laser source output window 170, for sealing the laser source output window 170 inside the lance mounting fixture 322, similar to the above-described arrangement of the beam conditioning module 220. At the lance distal end 330, the lance turning mirror 332 is shown oriented at 45 degrees relative to the direction of the laser beam 172 from the laser source 150. However, the lance turning mirror 332 may be oriented at other angles, such as 30 degrees or 60 degrees or other angles that allow reaching otherwise inaccessible areas. The lance turning mirror 332 redirects the laser beam 172 radially out of the tubular lance 324 through the lance aperture 334. For each orientation (e.g., 30, 45, 60, or 90 degrees) of the lance turning mirror 332, a separate lance assembly 329 may be manufactured. The location of the lance aperture 334 on each lance assembly 329 may be different, to account for the different exit angle of the laser beam 172.

Figure 25:
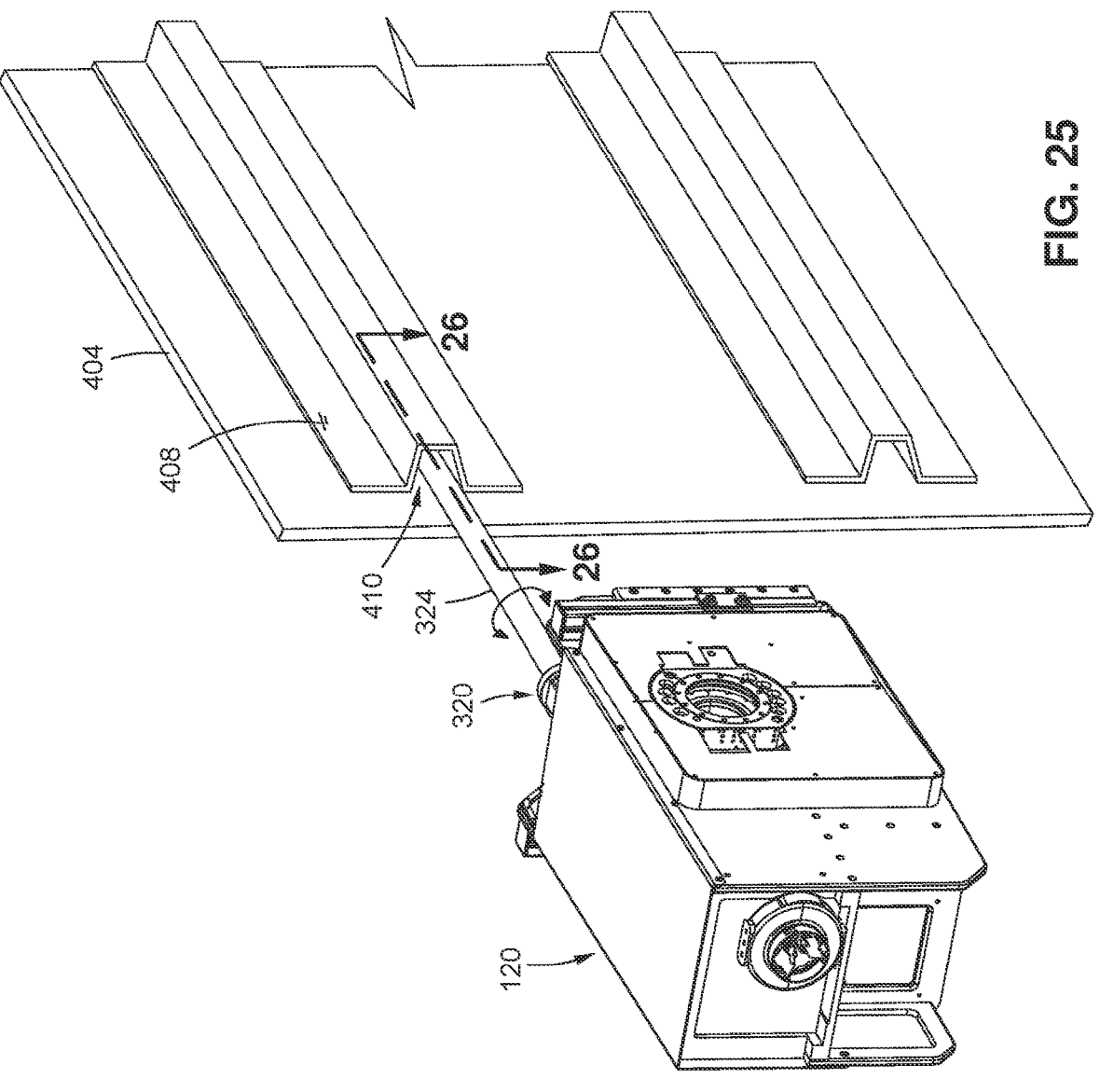
FIG. 25 shows the laser module of FIG. 24 with the lance distal end inserted into the cavity of the hat stringer for processing the workpiece surfaces inside the hat stringer.
Figure 26:
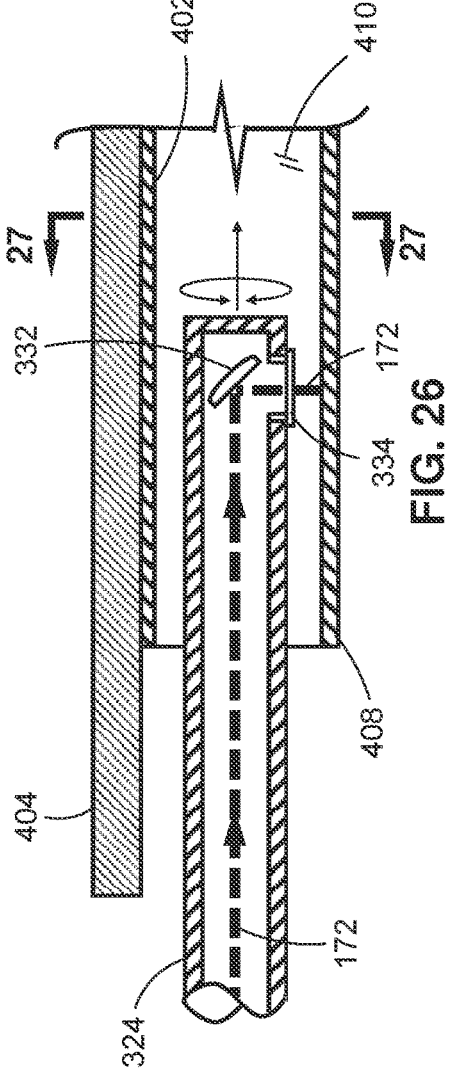
FIG. 26 is a top sectional view taken along line 26-26 of FIG. 25, and illustrating the laser beam being directed radially outwardly from the lance distal end for processing the workpiece surfaces within the cavity of the hat stringer.
Figure 27:
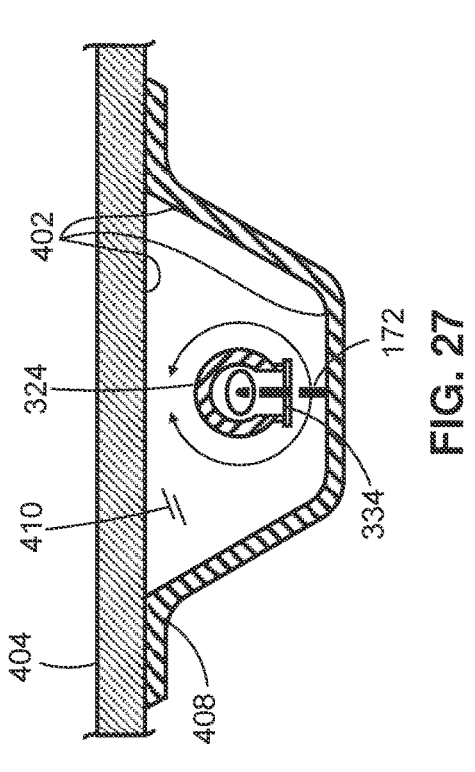
FIG. 27 is a transverse sectional view taken along line 27-27 of FIG. 26, and illustrating the tubular lance being rotated for radially distributing the laser beam for processing the workpiece surfaces within the cavity.

As shown in FIGS. 25-27, the tubular lance 324 is configured to rotate about the lance axis 326 (FIG. 19) for radially distributing the laser beam 172 emitted from the lance aperture 334. As shown in FIGS. 22-23, the lance assembly 320 includes a rotary gear mechanism 346 for rotating the tubular lance 324. The lance proximal end 328 is coupled to the rotary gear mechanism 346. The rotary gear mechanism 346 is housed within a rotary gear housing 348, which is coupled to the lance mounting fixture 322. The rotary gear mechanism 346 includes a lance motor 350 for rotating the tubular lance 324. In one example, the rotary gear mechanism 346 and lance motor 350 may be configured as a slew drive 352, in which the lance motor 350 rotates a worm gear or pinion gear (not shown). The teeth of the worm gear or pinion gear are engaged to the teeth of a bearing-mounted spur gear, also referred to as a slewing ring 354, which is coupled to the lance proximal end 328. The rotary gear mechanism 346 may include an absolute encoder to allow for precise control of the lance rotation. However, the rotary gear mechanism 346 may be provided in any one of a variety of different configurations, and is not limited to a slew drive 352.

Figure 24:
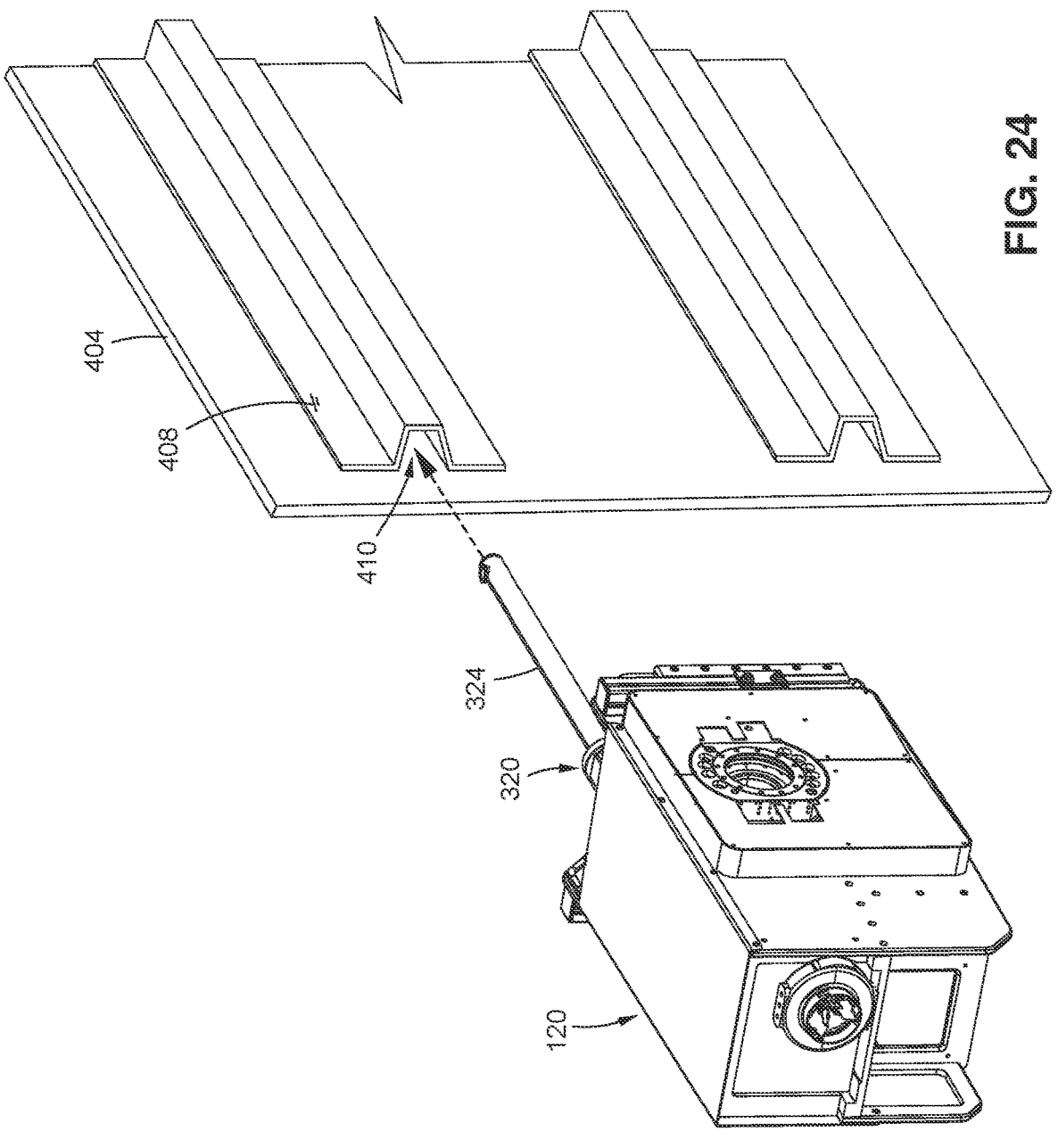
FIG. 24 is a perspective view of the laser module of FIGS. 19-23 prior to insertion of the tubular lance into a cavity of a hat stringer of a composite panel.

Advantageously, the lance assembly 320 allows for automated laser ablation of workpiece surfaces 402 inside narrow cavities 410 and other confined locations that may not be manually accessible. Laser ablation may be performed to prepare the cavities 410 for painting by increasing the roughness of the workpiece surfaces 402 inside the cavities 410. In the example of FIGS. 24-25, the tubular lance 324 is inserted into a cavity 410 defined by a hat stringer 408 mounted on a composite panel 404. FIGS. 26-27 show the laser beam 172 directed radially outwardly from the lance distal end 330 for laser ablation of the workpiece surfaces 402 within the cavity 410. The combination of laser pulse control, insertion depth control into the cavity 410, and rotational control of the tubular lance 324 allows for laser rastering of the workpiece surfaces 402 in the cavity 410.

Referring to FIG. 22, the lance assembly 320 may include a lance purge system 338 configured to inject a gas 240 into the lance mounting fixture 322. The gas 240 then flows through the tubular lance 324 and out of the lance distal end 330, thereby keeping the optics (e.g., lance turning mirror 332, lance aperture 334, etc.) clean and cool, and removing effluent 422 from the work area. The gas 240 is preferably clean and dry air, or an ultra-high purity inert gas, such as nitrogen gas. In FIG. 22, the gas 240 is injected into the lance mounting fixture 322 via a lance injection port 340. The lance proximal end 328 includes a lance end cap 344 having a lance exhaust port 342 for releasing the gas 240 after flowing through the tubular lance 324. In addition to preventing contaminants 420 from entering the tubular lance 324, the gas 240 exiting the lance exhaust port 342 blows contaminants 420 out of the cavity 410.

Referring now to FIGS. 28-31, shown is an example of two or more laser modules 120 mounted in side-by-side arrangement. Advantageously, supporting two (or more) laser modules 120 on a robotic arm 102 (FIG. 1) allows for automated processing of large parts, such as aircraft wings and fuselage. The laser modules 120 are supported by a laser module mounting fixture 122 that has a yoke configuration coupled to a robotic arm 102. The yoke configuration includes a yoke fixture 108 (FIGS. 30-31) that is pivotably attached to opposite sides of the laser module mounting fixture 122. The yoke fixture 108 is configured to pivot a yoke pivot axis 110, which is oriented perpendicular to the direction of the laser beam 172. The yoke fixture 108 is configured to allow the laser module mounting fixture 122 to pivot ±90 degrees about the yoke pivot axis 110. Each one of the laser modules 120 is supported by a base plate 126 that is removable via quick-release fixtures 128, similar to the quick-release fixtures 128 described above for the arrangement shown in FIGS. 9 and 13. In the example of FIGS. 28-31, the laser modules 120 each have a scan field 182 of 12 inches×12 inches, requiring a spacing of approximate 10.5 inches between the centers of the scanner exit windows 264. However, the laser modules 120 may be separated by different spacing distances, as dictated by the laser source parameters, the desired spot size, and other factors.

Figures 28, 29:
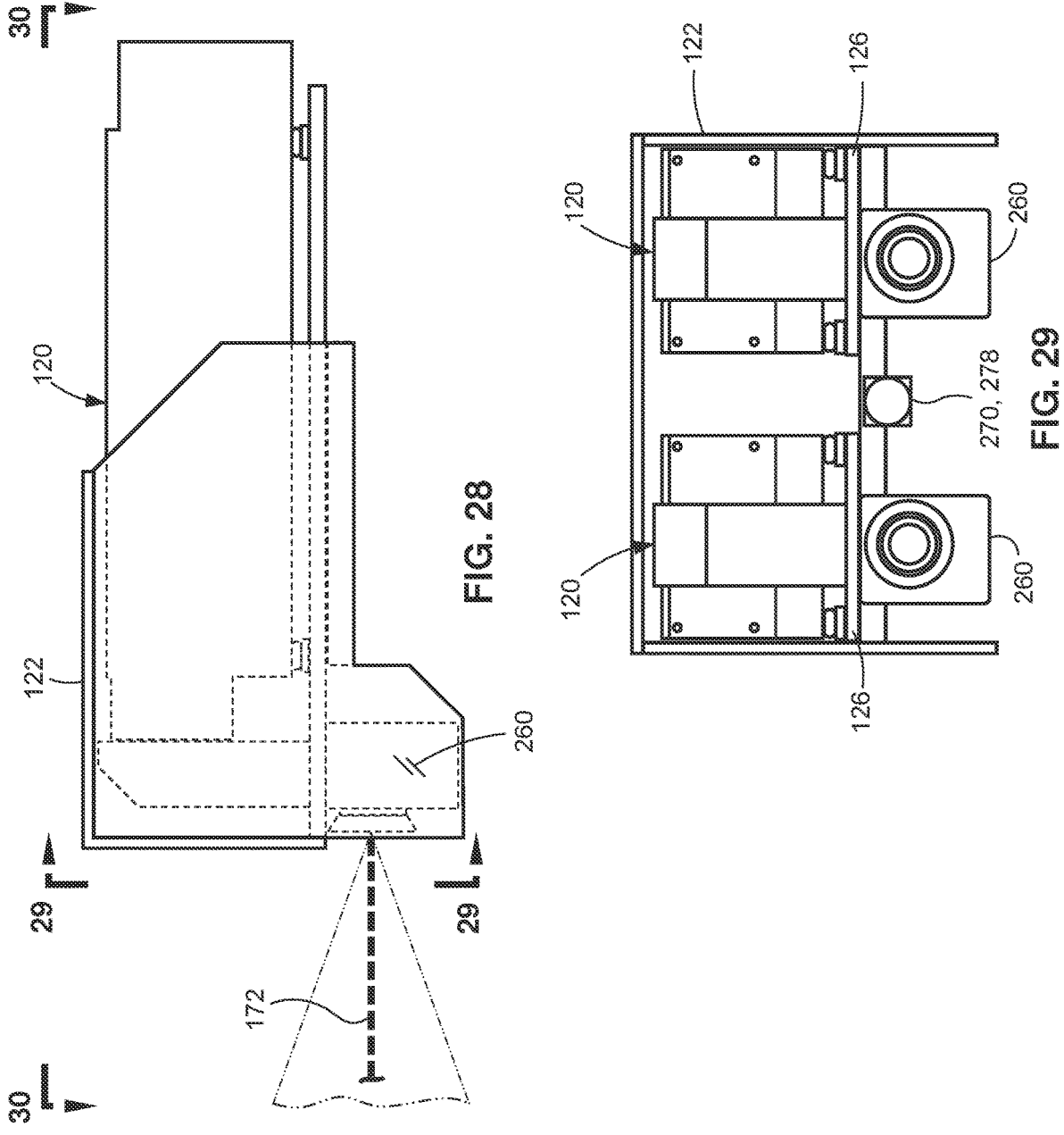
FIG. 28 is a side schematic illustration of an arrangement in which two or more laser modules are positioned side-by-side and supported by a laser module mounting fixture having a yoke configuration, for increasing processing rate capability.
FIG. 29 is a front view of the arrangement taken along line 29-29 of FIG. 28, illustrating spacing considerations for two identical laser modules positioned side-by-side, and supported by a laser module mounting fixture.
Figures 30, 31:
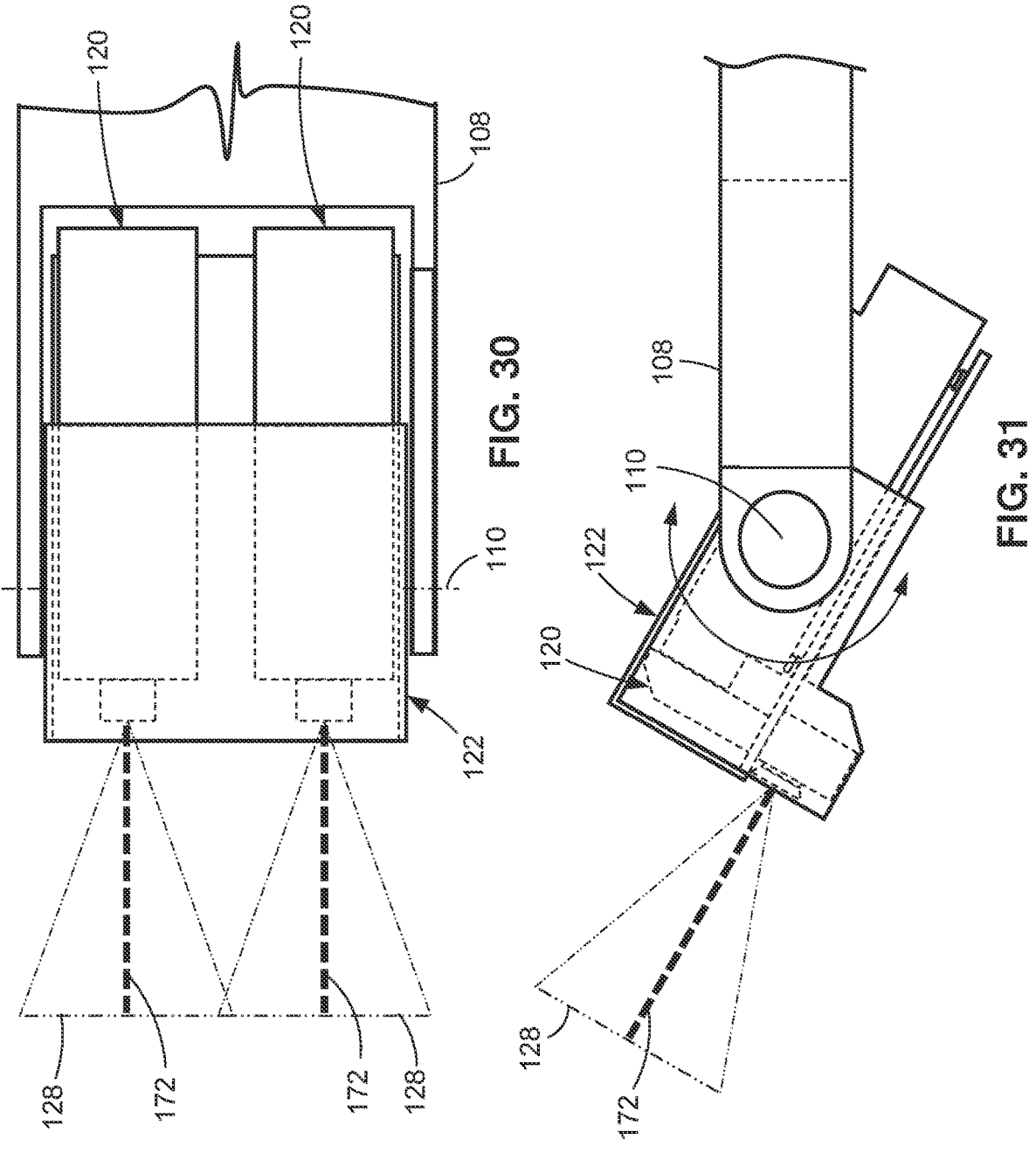
FIG. 30 is a top view of the arrangement taken along line 30-30 of FIG. 28, and illustrating the yoke configuration of the laser module mounting fixture for supporting the side-by-side laser modules in a manner facilitating maintenance of the laser modules, and rapid replacement of each laser module with an identical laser module.
FIG. 31 is a side view of the arrangement of laser modules of FIGS. 28-30, and illustrating the yoke configuration laser module mounting fixture being pivotable about a yoke pivot axis that is oriented perpendicular to the direction of the laser beam, to allow for tilt positioning of the laser modules in unison.

Each laser module 120 is configured similar to the laser module arrangement shown in FIGS. 2-4, with the exception of the laser module mounting fixture 122. In addition, instead of each laser module 120 having their own dedicated sensors 270, the side-by-side laser modules 120 may share some of the above-described sensors 270, such as the displacement sensors 272 (not shown) and the imaging devices 278. For example, a pair of side-by-side laser modules 120 may share one or more imaging devices 278 (i.e., cameras), which may be centrally located between the laser modules 120 as shown in FIG. 29. Although not shown, a displacement sensor 272 may be mounted on the outboard side of each laser scanner 260, to allow for standoff distance and normality measurements. Any one or more of the other above-described laser module components and functionalities may be included with the side-by-side laser modules 120 shown in FIGS. 28-31.

Advantageously, the above-described laser module 120 (e.g., in FIGS. 1-31) provides a compact form factor for automated laser processing of a wide variety of workpiece configurations. Furthermore, the laser module 120 has a modular design that allows for rapid maintenance and reconfiguration of the laser module 120 components to accommodate a wide variety of applications (e.g., surface preparation, depainting, etc.) on a wide variety of workpiece sizes and shapes. The arrangement of the laser module 120 also provides protection for delicate components (e.g., the laser optical equipment 244, the laser scanner 260, the imaging devices 278, etc.) from harsh industrial environments, and from contaminants 420 generated by the laser beam 172 impinging on workpiece surfaces 402. Although described in the context of laser ablation, the laser module 120 may be implemented for performing any one of a variety of operations including, but not limited to, trimming, forming cutouts such as holes, marking, and engraving.

Figure 37:
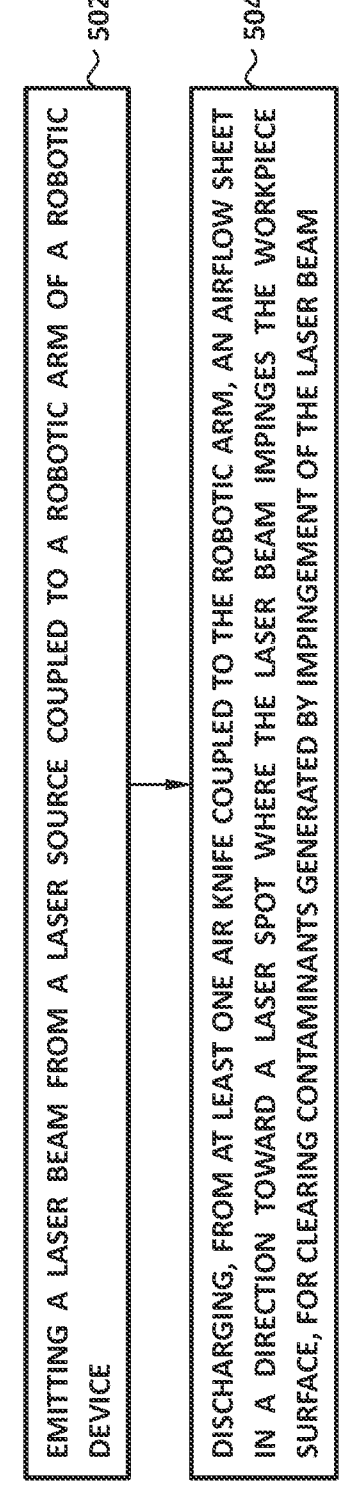
FIG. 37 is a flowchart of operations included in a method of processing a workpiece using a laser module.

Referring to FIG. 37, shown is a method 500 of processing a workpiece 400. The method includes step 502 of emitting a laser beam 172 from a laser source 150 of a laser module 120 coupled to a robotic arm 102 of a robotic device 100. The laser module 120 is configured similar to the above-described arrangement shown in the figures. The step 502 of emitting the laser beam 172 from the laser source 150 comprises emitting an ultraviolet (UV) laser beam from a UV laser source, as described above. In another example, step 502 of emitting the laser beam 172 comprises emitting an infrared (IR) laser beam from an IR laser source, as described above.

In examples where a UV laser beam is emitted from a UV laser source, the method may include limiting, using a robot controller 104, rotation of the laser module 120 such that the laser module 120 is maintained in a substantially upright orientation 162 (FIGS. 4 and 8), as described above. In this regard, the method includes limiting rotation of the laser module 120 about the X-axis 164 (FIGS. 4 and 8) to more than 90 degrees in either direction (i.e., side-to-side rotation) from the upright orientation 162, and limiting rotation of the laser module 120 about the Y-axis 166 (FIGS. 4 and 8) to no more than 90 degrees in either direction (i.e., end-to-end rotation) from the upright orientation 162. As mentioned above, when the laser source 150 is in the upright orientation 162, the Z-axis 168 is vertically oriented, and the X-axis 164 and Y-axis 166 are both horizontally oriented. By limiting the amount of rotation of the laser module 120 from the upright orientation 162, the power (e.g., energy) of the laser source 150 may be maintained at no less than 90 percent of the power of the laser source 150 in the upright orientation 162.

Step 504 of the method 500 includes discharging, from at least one air knife 200 coupled to the robotic arm 102, an airflow sheet 206 in a direction toward the laser spot 180 where the laser beam 172 impinges the workpiece surface 402. In the example shown, the laser module 120 includes a pair of air knives 200, each configured to discharge a high-velocity airflow sheet 206 of compressed air. Each airflow sheet 206 entrains ambient air 300, resulting in an air wedge 210 flowing toward the workpiece surface 402. As described above, the airflow sheets 206 and air wedges 210 clear the workpiece surface 402 of contaminants 420 generated by the impingement of the laser beam 172 on the workpiece surface 402. In addition, the airflow sheets 206 and air wedges 210 clear the three-dimensional space between the laser module 120 and the workpiece 400.

For the laser module 120 configuration shown in FIGS. 1-18, the method includes redirecting, using the conditioning module turning mirror 246 of the beam conditioning module 220, the laser beam 172 emitted by the laser source 150. For the example laser module 120 shown in the above-described FIGS. 11 and 13, the method includes changing the diameter of the laser beam 172, using a beam expander 248 located downstream of the conditioning module turning mirror 246. In addition, the method includes focusing, using a fixed focus lens 250 located downstream of the beam expander 248, the laser beam 172 down to the laser spot 180 on the workpiece surface 402. As described above, the beam conditioning module housing 222 contains the conditioning module turning mirror 246, the beam expander 248, and the fixed focus lens 250.

Referring to FIGS. 14-15, the method may include positively pressurizing the beam conditioning module housing 222 to thereby prevent entry of contaminants 420 into the beam conditioning module housing 222. As described above, the laser module 120 may include a conditioning module purge system 236 in which a gas, such as dry air or ultra-high-purity nitrogen gas, is injected into the beam conditioning module housing 222 via a module injection port 238. The beam conditioning module housing 222 may include a module exhaust port 242, which may include a breather valve to prevent over-pressurization of the beam conditioning module housing 222.

Upon passing through the beam conditioning module 220, the method includes receiving, at the laser scanner 260, the laser beam 172 from the conditioning module turning mirror 246, and the beam expander 248 and fixed focus lens 250, if included with the beam conditioning module 220. Furthermore, the method includes scanning, using the laser scanner 260, the laser beam 172 over a scan field 182 on the workpiece surface 402, as illustrated in FIG. 2. For example, the laser scanner 260 moves the laser spot 180 in raster mode over a scanning path 184 along parallel rows defining a serpentine pattern within the scan field 182, as described above and shown in FIG. 5.

Figures 32, 33:
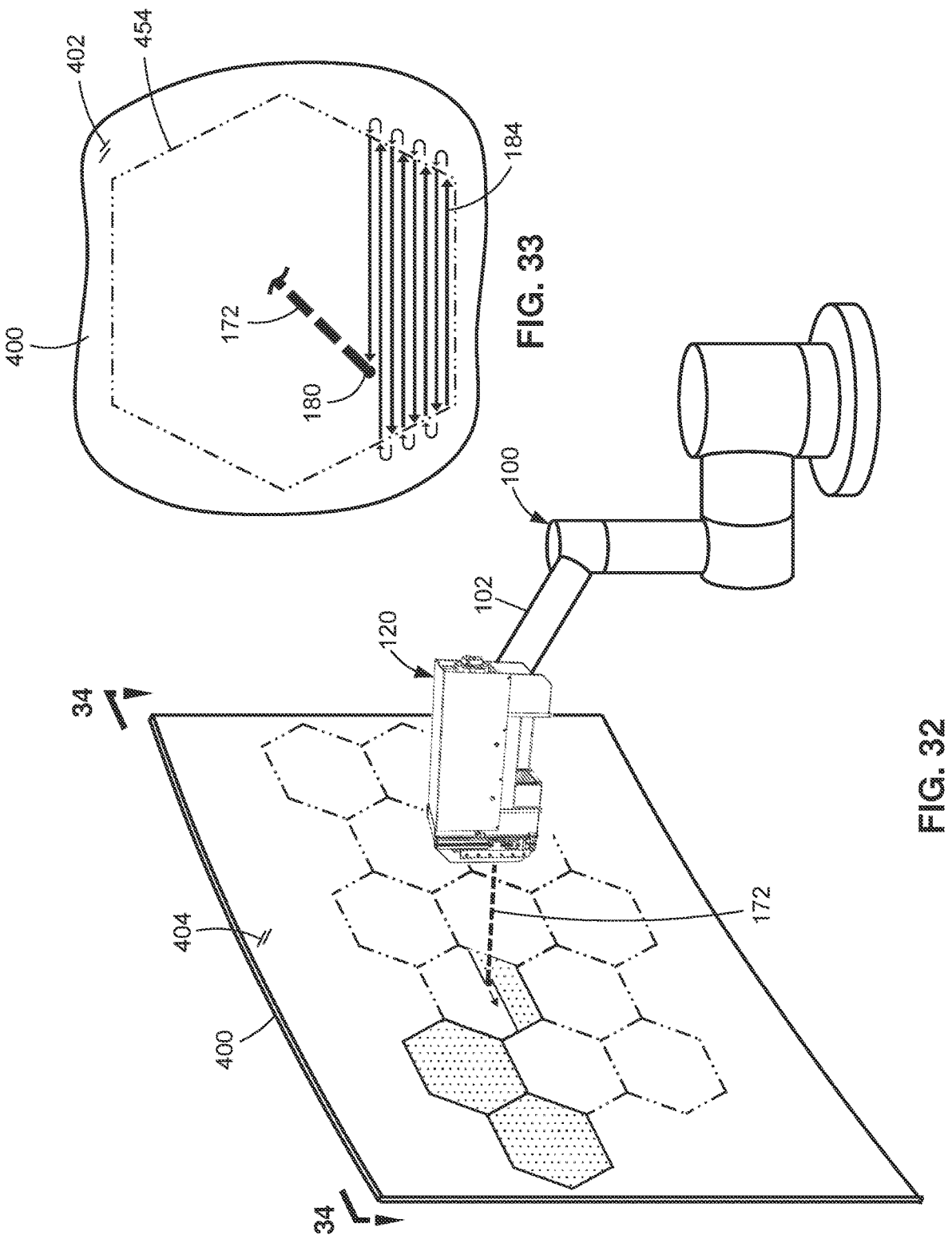
FIG. 32 is a perspective view of an example of a laser module processing a workpiece via hexagonal tiling, in which the robotic arm sequentially positions the laser module at a series of spatial locations, and scans the laser beam over a hexagonal scan field at each spatial location.
FIG. 33 is a schematic plan view of an example of a hexagonal scan field on a workpiece surface, and illustrating the serpentine movement of the laser spot along the scanning path within the hexagonal scan field.

Referring to FIGS. 32-38, shown is an example of the process of hexagonal tiling, which is an optimized scanning method that uses hexagonally-shaped scan fields (e.g., first, second, and third hexagonal scan fields 450, 452, 454, etc.) for processing a workpiece surface 402. The shape of the hexagonal scan fields is the result of the laser scanner software, which places virtual limits on the laser scanner 260 when scanning the laser beam 172 back and forth along parallel rows, as shown in FIG. 33. During hexagonal tiling, the robot controller 104 and the laser scanner 260 software cooperate to ensure the overlap of the laser scans. Although the number and size of overlaps of the hexagonal scan fields has little affect on coating adhesion, gaps are not acceptable. However, from a structural integrity standpoint, it is necessary to minimize the number and size of the overlapped areas to prevent over-processing of such areas, which can result in undesirable effects on the underlying substrate.

Advantageously, the use of hexagonal tiling can reduce the amount of overlapped surface area by approximately 25 percent relative to conventional tiling practices that use square-shaped scan fields 182 (e.g., FIG. 2). In addition, hexagonal tiling covers the same amount of surface area at a faster rate than conventional tiling using square-shaped scan fields 182. Furthermore, hexagonal scan fields make improved use of the usable area of a round F-theta lens 266, due to obtuse corners that reduce the variation in laser energy as the laser beam 172 is scanned across the hexagonal scan field. Additionally, hexagonal tiling maximizes area coverage using hexagonal scan fields, and allows for processing of workpieces 400 that have a smaller radius of curvature and/or which are highly contoured. Hexagonal tiling can be used for any one of a variety of laser processes on workpiece surfaces 402, such as surface preparation (i.e., for painting), or removing existing paint (i.e., depainting).

Figure 34:
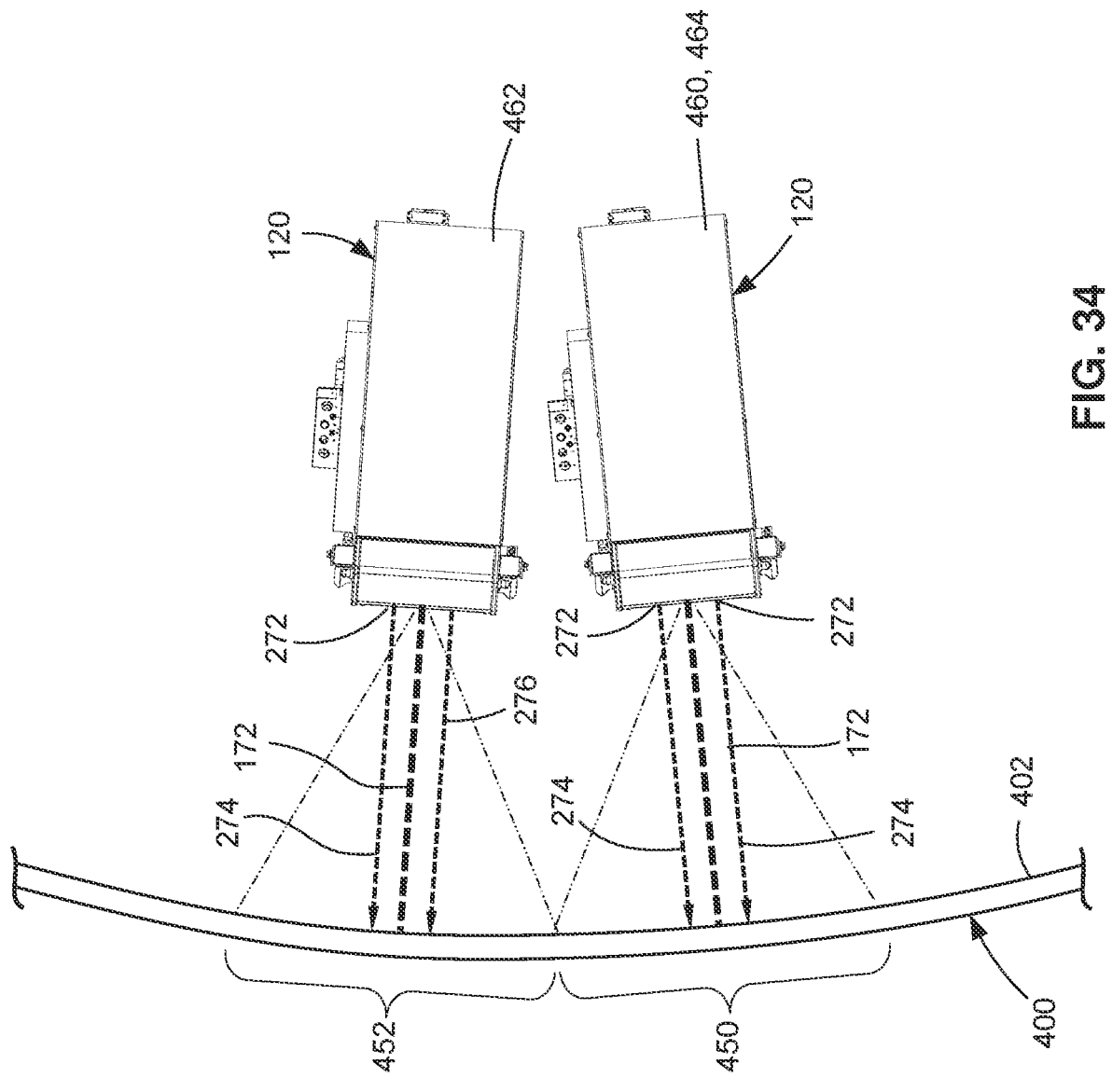
FIG. 34 is a top-town view taken along line 34-34 of FIG. 32, and illustrating the positioning of the laser module at a series of different spatial locations, and the scanning of the laser beam over a hexagonal scan field at each spatial location for processing the workpiece surface.

Referring to FIGS. 32-36, the process of scanning the laser beam 172 during hexagonal tiling comprises moving, via the robotic arm 102, the laser module 120 to a first spatial location 460 relative to the workpiece surface 402, as shown in FIG. 34. Once the laser module 120 is positioned at the first spatial location 460, the method includes measuring, via the sensor laser beams 274 emitted by the displacement sensors 272, the actual standoff distance 276 (FIG. 4) between the laser scanner 260 and the workpiece surface 402 with the laser module 120 at the first spatial location 460, and adjusting, using the robotic device 100, the position of the laser module 120 until the actual standoff distance 276 is within a predetermined tolerance (e.g., within 0.5 inch) of the nominal standoff distance, and adjusting, using the robotic device 100, the orientation of the laser module 120 until the laser beam 172 is within a predetermined tolerance (e.g., within 5 degrees) of an orientation that is substantially normal or locally perpendicular to the workpiece surface 402. Although the laser beam 172 is preferably normal (i.e., 90 degrees) to the workpiece surface 402 during laser scanning, ablation of the workpiece surface 402 may be successfully performed with the laser beam 172 oriented at an angle of up to 35 degrees from a normal or perpendicular orientation.

Figures 35, 36:
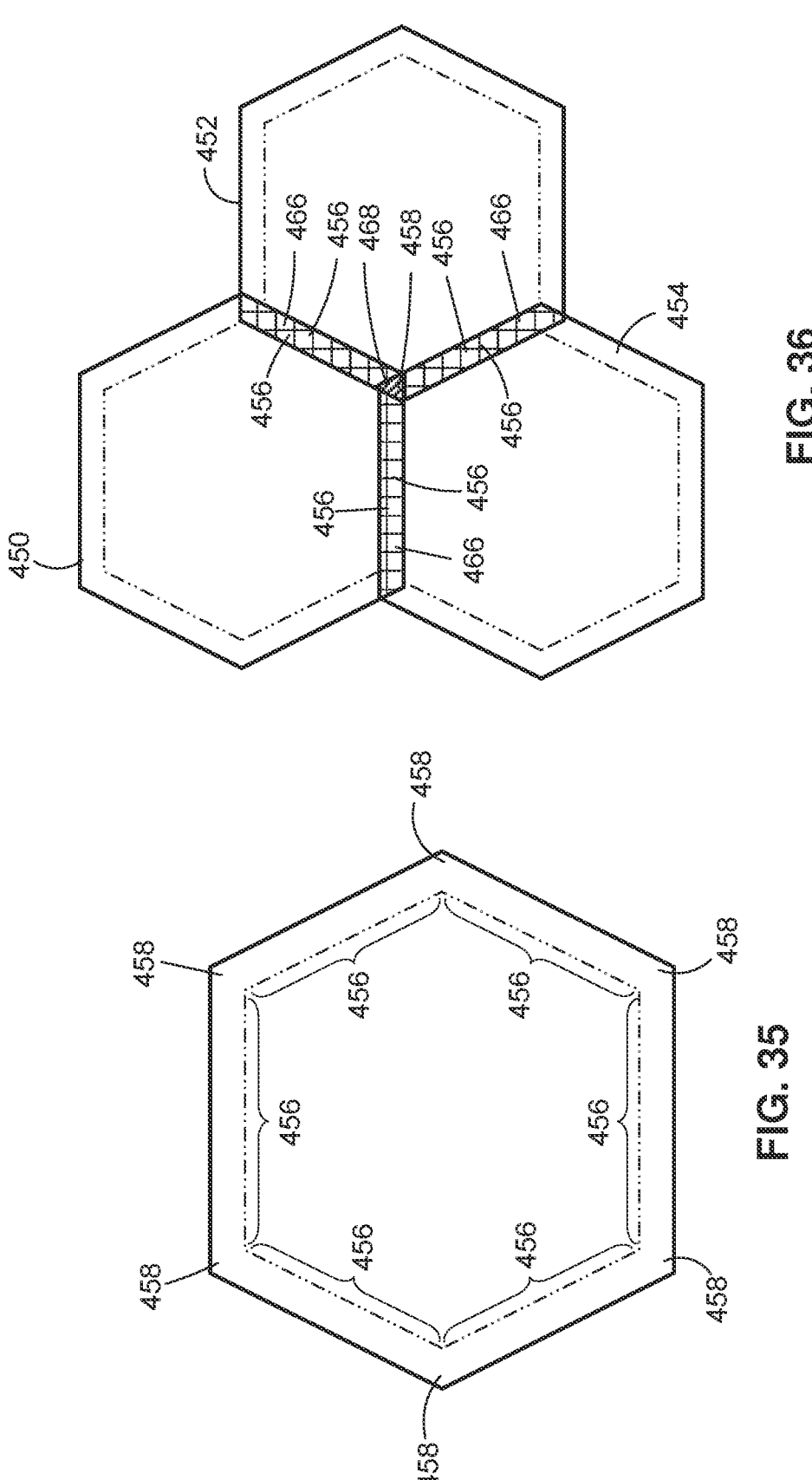
FIG. 35 is an illustration of an example of a hexagonal scan field, which has 6 side portions each having 2 corner portions, defining opposing ends of the side portion.
FIG. 36 is an illustration of a first, second, and third hexagonal scan fields, and illustrating the overlap of the side portions and associated corner portions.

After the actual standoff distance 276 and the normality have been adjusted at the first spatial location 460, the method includes scanning, using the laser scanner 260, the laser beam 172 over a first hexagonal scan field 450, as shown in FIG. 33. As shown in FIG. 35, each hexagonal scan field has 6 side portions 456, each having a pair of corner portions 458 defining opposing ends of the side portion 456. As shown in FIG. 33, the laser scanner 260 moves the laser spot 180 along the scanning path 184 in parallel rows in a bi-directional, serpentine manner. As described above, the laser source 150 emits laser beam 172 pulses at a fixed repetition rate as the laser spot 180 is moved in rows, from bottom to top, until the area of the workpiece surface 402 within the hexagonal scan field is completely ablated.

After ablating the workpiece surface 402 within the first hexagonal scan field 450, the method includes moving, via the robotic arm 102, the laser module 120 to a second spatial location 462, as shown in FIG. 34. Once the laser module 120 is at the second spatial location 462, the method includes measuring the actual standoff distance 276 using the displacement sensors 272, and adjusting the location and normality of the laser module 120 as necessary until within predetermined tolerances. The method then includes scanning, using the laser scanner 260, the laser beam 172 over a second hexagonal scan field 452 (FIG. 36) on the workpiece surface 402 such that one of the side portions 456 and associated corner portions 458 of the second hexagonal scan field 452 respectively overlaps one of the side portions 456 and associated corner portions 458 of the first hexagonal scan field 450, as shown in FIG. 36. The hexagonal scan fields are arranged such that the side edges of the overlapping side portions 456 are parallel to each other.

After ablating the workpiece surface 402 within the second hexagonal scan field 452, the method includes moving, via the robotic arm 102, the laser module 120 to a third spatial location 464, as shown in FIG. 34 which, in this example, is located directly below the first spatial location 460. Once the laser module 120 is at the third spatial location 464, the method includes again measuring the actual standoff distance 276, and adjusting the location and normality of the laser module 120 as necessary until within predetermined tolerances of the nominal standoff distance and a normal orientation.

Referring to FIG. 36, the method then includes scanning, using the laser scanner 260, the laser beam 172 over a third hexagonal scan field 454, on the workpiece surface 402 such that one of the side portions 456 and associated corner portions 458 of the third hexagonal scan field 454 respectively overlaps one of the side portions 456 and associated corner portions 458 of the first hexagonal scan field 450, and another one of the side portions 456 and associated corner portions 458 of the third hexagonal scan field 454 respectively overlaps one of the side portions 456 and associated corner portions 458 of the second hexagonal scan field 452. As shown in FIG. 36, the hexagonal scan fields result in a double overlap region 466 at the side portions 456, and a triple overlap region 468 at the corner portions 458.

In addition to the above-mentioned advantages of hexagonal tiling, the use of a hexagonal scan field results in a maximum of triple overlap at locations where the hexagonal scan fields intersect and overlap. In contrast, the use of conventional square-shaped scan fields 182 (e.g., FIG. 2) results in quadruple overlaps at the corner portions (not shown) where 4 of the square-shaped scan fields 182 intersect and overlap, and which can result in undesirable effects on the underlying substrate.

In FIGS. 32 and 36, the first, second, third hexagonal scan fields 450, 452, 454 (and subsequent hexagonal scan fields) are substantially equal in size. However, in other examples, the hexagonal scan fields may be of two or more sizes. For example, FIG. 37 shows a plurality of relatively large hexagonal scan fields 472 of equal size surrounding a plurality of small hexagonal scan fields 474. Although there are several quadruple overlap regions (in addition to double overlap regions and triple overlap regions), the use of relatively small hexagonal scan fields 474 allows for efficiently processing workpiece surfaces 402 that have complex contours, relative to the reduced efficiency that occurs when using conventional square-shaped scan fields.

As mentioned above, the method includes measuring, using one or more displacement sensors 272 (e.g., FIGS. 8-10), the actual standoff distance 276 between the laser module 120 and the workpiece surface 402, and generating standoff distance measurements representing the actual standoff distance 276. The method additionally includes transmitting the standoff distance measurements to a robot controller 104 of the robotic device 100, and adjusting, using the robotic device 100, the location of the laser module 120 to maintain the actual standoff distance 276 to within a predetermined tolerance of a nominal standoff distance. For example, the robotic device 100 may compare the standoff distance measurements to the nominal standoff distance, and adjust the spatial location of the laser module 120 until within a predetermined tolerance (e.g., 0.5 inch) of the nominal standoff distance.

Additionally, the method includes transmitting, from at least two of the displacement sensors 272 (e.g., FIGS. 4 and 8) spaced apart from each other, the standoff distance measurements to the robotic device 100, and adjusting the adjusting, using the robotic device 100, the orientation of the laser module 120 to maintain the laser beam 172 within a predetermined tolerance of an orientation normal to the workpiece surface 402. As mentioned above, the laser module 120 is preferably oriented perpendicular to the workpiece surface 402. However, the laser module 120 may be capable of successfully processing (e.g., ablating) a workpiece surface 402 when the laser module 120 is oriented at angles of up to 35 degrees from the normal or perpendicular orientation.

During processing of the workpiece surface 402, the method may include imaging the workpiece surface 402 using at least one imaging device 278 of the laser module 120. In the example shown (e.g., FIG. 10), the laser module 120 include a high-definition camera 282 for transmitting, to a display monitor 372, images of the workpiece surface 402 and surrounding area for visual monitoring of the workpiece 400 during processing by the laser beam 172. The images recorded by the high-definition camera 282 may be still images or video of the workpiece surface 402 and surrounding area, and may be displayed on a display monitor 372, such as of a laptop computer 374 or other display device.

In the example of FIG. 10, the laser module 120 includes a machine vision camera 280 for transmitting, to a processor 370, images of the workpiece surface 402, and performing any one of a variety of tasks. For example, the method may include determining a location and orientation of the work-piece 400 within a manufacturing cell (not shown) containing the laser module 120. In addition, the method may include determining a location of one or more features of the workpiece 400, such as the location of holes, cutouts, or components mounted to the workpiece 400. In another example, the method may include monitoring the effectiveness of the laser module 120 in processing the workpiece 400, and determining whether the workpiece 400 is being processed within process tolerances. In this regard, the method may include generating a record of the processing of the workpiece 400. In another example, the method may include calibrating the laser scanner 260 and/or calibrating a tool center point (not shown) of the robotic arm 102.

Referring to FIGS. 16-18, the method may include drawing, using a fan 302, ambient air 300 into the sensor housing 290 containing the laser scanner 260. The method may include pre-filtering the ambient air 300 of particulates prior to drawing the air into the sensor housing 290. As described above, the sensor housing 290 has a faceplate 134 with a scanner window cutout 296 sized complementary to the scanner exit window 264, and which forms an air gap 298 between the faceplate 134 and the scanner exit window 264. In addition, the faceplate 134 has sensor window cutouts 294 that are sized complementary to the sensor windows 284 of the imaging devices 278 and the displacement sensors 272. The method includes discharging the ambient air 300 through the air gaps 298 to blow contaminants 420 (e.g., fumes and effluent 422) away from the scanner exit window 264. The method additionally includes entraining or drawing air out of the air gaps 298 using the airflow sheets 206 that are discharged by the air knives 200 on opposite sides of the laser module 120.

To avoid static charge buildup on the laser module components and/or on the workpiece surface 402, the method includes releasing, using a de-ionizing device, ions into the ambient air 300 proximate the workpiece surface 402 and/or proximate the laser module 120, for neutralizing static buildup and preventing contamination of the workpiece surface 402 and/or one or more sensor windows 284 associated with the laser module 120. In one example, the method includes emitting ions from a de-ionizing bar 308 located in the sensor housing 290 immediately adjacent the fan 302, as shown in FIG. 17 and described above. In another example, the method includes providing the air knives 200 as ionizing air knives 200, and emitting ions into the airflow sheets 206 discharged by the ionizing air knives 200.

As mentioned above, the laser module 120 allows for performing a variety of laser processing tasks. For example, the method includes using the laser module 120 to ablate a composite surface of a composite panel 404, to remove a thin layer (e.g., 2 microns) of the resin cap 406 of the composite panel 404, and forming a roughened surface on the resin cap 406 while leaving the composite substrate intact. The roughened surface promotes the adhesion of a subsequently-applied coating material (e.g., paint). Advantageously, the laser module 120 can replace the conventional practice of hand-sanding composite surfaces in preparation for painting. For large composite parts such as a composite wing skin of a commercial aircraft, the laser module 120 can reduce a multi-day operation of manual sanding the wing skin down to several hours. In another example, the method includes using the laser module 120 to remove paint from a workpiece surface 402 (i.e., depainting). In addition, the method includes using the laser model to perform other operations including, but not limited to, cleaning, marking, engraving, and drilling. Advantageously, the modular design facilitates rapid reconfiguration of the laser module 120 for a given application with minor changes to the laser optical equipment 244.

Referring to FIG. 38, shown is a method 600 of processing a workpiece 400 using the above-described lance configuration of the laser module 120 shown in FIGS. 19-27. As shown in FIG. 20, the method includes removing the beam conditioning module 220 from the laser module 120, and installing the lance assembly 320 in place of the beam conditioning module 220. Advantageously, the fastener pattern 224 for attaching the lance mounting fixture 322 to the base plate 126 of the laser module 120 is the same as the fastener pattern 224 for attaching the beam conditioning module 220 to the base plate 126. In addition, the base plate 126 includes dowel pins 226 for quickly locating and orienting the lance assembly 320 relative to the laser source 150 so that the tubular lance 324 is aligned with the laser beam 172. Once the lance assembly 320 is installed, the method includes inserting the tubular lance 324 into the cavity 410 of a workpiece 400. In the example of FIGS. 24-25, the tubular lance 324 is inserted into a cavity 410 defined by a hat stringer 408 mounted on a composite panel 404.

Step 602 of the method 600 includes emitting a laser beam 172 from the laser source 150 of the laser module 120 (e.g., FIG. 21), which is coupled to a robotic arm 102 of a robotic device 100. As mentioned above, the laser source 150 may be configured to emit laser beam 172 pulses in a precisely-fixed pulse repetition rate. Step 604 of the method 600 includes receiving, in a tubular lance 324, the laser beam 172 from the laser source 150, also shown in FIG. 21. As described above, the tubular lance 324 has a lance proximal end 328 and a lance distal end 330. The lance distal end 330 houses a lance turning mirror 332 and has a lance aperture 334. As mentioned above, the lance turning mirror 332 may be oriented at any one of a variety of angles (e.g., 30, 45, 60, 75, 90 degrees, or other angles) that allow reaching otherwise inaccessible areas. Step 606 of the method 600 includes redirecting, using the lance turning mirror 332, the laser beam 172 radially out of the tubular lance 324 through the lance aperture 334, and forming a laser spot 180 where each laser beam 172 pulses impinge the workpiece surface 402, for ablating the workpiece surfaces 402 within the cavity 410.

The method includes rotating the tubular lance 324 about the lance axis 326 for radially distributing the laser beam 172 emitted from the lance aperture 334, as shown in FIGS. 27-28. The tubular lance 324 may be operated in a manner causing the laser beam 172 to move along a variety of motion patterns for processing (e.g., ablating) a workpiece surface 402 in a confined area, such as a cavity 410. In one example, the laser beam 172 is emitted while the tubular lance 324 is inserted into a cavity 410, and then rotated while the tubular lance 324 is axially stationary, resulting in a radial ablation path of the laser beam 172 on the workpiece surface 402 inside the cavity 410. In another example, the laser beam 172 is emitted while the tubular lance 324 is rotated while being axially translated within the cavity 410, respectively resulting in an inwardly or outwardly spiraling ablation path of the laser beam 172. In a still further example, the laser beam 172 is emitted while the tubular lance 324 is rotated back and forth while axially translated within the cavity 410, resulting in a zig-zagging ablation path of the laser beam 172. To generate a raster pattern of parallel ablation lines, the laser beam 172 is emitted while the tubular lance 324 is maintained at a specific angular orientation while axially translated within the cavity 410 to ablate a single line, after which the tubular lance 324 is rotated slightly to a different angular orientation, and the tubular lance 324 is then axially translated in the opposite direction within the cavity 410 to ablate a second line parallel to the first line. The process is repeated to generate the raster pattern of parallel ablation lines.

The translation of the tubular lance 324 is achieved via the robotic arm 102, while the step of rotating the tubular lance 324 is performed via the rotary gear mechanism 346, which is coupled to the lance proximal end 328 and supported by the rotary gear housing 348 mounted to the lance mounting fixture 322. In the example described above, the rotary gear mechanism 346 is a slew drive 352 having a lance motor 350 for rotating a worm gear (not shown) that is engaged to teeth on the circumference of a slewing gear 354. In one example of operation, the tubular lance 324 may be slowly inserted into or axially moved within a cavity 410, while the rotary gear mechanism 346 rotates the tubular lance 324 inside the cavity 410. The laser beam 172 pulses emitted from the tubular lance 324 are radially distributed for ablating the inner surfaces of the cavity 410 to ensure coating (e.g., paint) adhesion.

Referring briefly to FIG. 22, in some examples, the method includes purging the tubular lance 324 while emitting the laser beam 172 from the tubular lance 324. In this regard, the method includes injecting a gas 240 into the lance proximal end 328 of the tubular lance 324. For example, the method may include injecting clean, dry air, or a high-purity inert gas such as nitrogen gas, into a lance injection port 340 included with the lance mounting fixture 322. The method may include releasing the gas 240 from the lance exhaust port 342 formed in the lance end cap 344 at the lance distal end 330, to thereby promote gas flow through the tubular lance 324. The injection of gas 240 at the lance proximal end 328, and the release of the gas 240 at the lance distal end 330 promotes gas flow down the length of the tubular lance 324, which prevents contamination buildup on the lance optics such as the lance turning mirror 332 and the lance aperture 334. In addition, the gas 240 cools the lance optics, removes effluent 422 from the area where the laser beam 172 impinges the workpiece surface 402, and blows effluent 422 out of the cavity 410.

In addition to performing laser ablation of a workpiece surface 402, the laser module 120 (e.g., FIGS. 1-18) may also be used to perform laser drilling (not shown), to form holes in a workpiece 400. As mentioned above, the laser module 120 emits laser pulses at a relatively high rate (e.g., 165 kHz). During laser ablation, the high pulse rate of the laser beam 172 necessitates scanning the laser beam 172 along a scanning path on the workpiece surface 402 to avoid drilling completely through the workpiece 400. As a safety precaution to avoid accidentally drilling through a workpiece 400 that is intended to be ablated, the laser module 120 incorporates a software interlock that prevents the laser source 150 from emitting laser beam 172 pulses unless the above-mentioned galvanometer mirrors (not shown) of the laser scanner 260 are moving. To intentionally perform a laser drilling operation, the software interlock is disabled, and the laser beam 172 pulses are emitted while at a stationary location.

The laser scanner 260 is capable of moving the laser beam 172 to each hole location at a rate, thereby allowing for drilling a large array of holes all at one time. For example, the laser module 120 is capable of drilling a 3000×3000 array of micro-holes in a relatively short period of time. The ability to rapidly drill large arrays of holes is advantageous for several applications, such as for forming relatively small-diameter acoustic perforations in aerospace panels, such as in the inner wall of a circumferential honeycomb panel that defines the inlet of a gas turbine engine (i.e., a jet engine). The laser module 120 is also capable of drilling an array of small perforations to allow precisely-controlled amounts of gas to pass through an aerodynamic surface or panel, such as for de-icing purposes, to promote laminar airflow, and/or for other purposes.

When drilling holes using the laser module 120, the size (e.g., diameter) of the holes is dependent upon the diameter of the laser spot 180 which, as mentioned above, is based on several parameters, such as the laser beam diameter, energy density, pulse repetition rate, beam profile, and the material properties and thickness of the workpiece 400. Changing the diameter of the laser spot 180 is relatively straightforward, and may be effected by changing out the beam expander 248, which results in different standoff distances 276 and spot sizes 180. Different beam expanders 248 can be tested on different applications (e.g., different workpiece materials and different workpiece thicknesses) to determine the optimal arrangement. The above-described laser module 120 is capable of forming holes ranging in diameter from 65-300 microns. Custom or non-standard beam expanders may be manufactured to meet specific hole size requirements, although a diameter of 500 microns may be the upper limit using the above-described laser module 120. In addition, laser drilling of holes deeper than 0.25 inch may present challenges, due to the need to pause long enough to allow the workpiece material to eject from the hole during drilling.

Additional modifications and improvements of the present disclosure may be apparent to those of ordinary skill in the art. Thus, the particular combination of parts described and illustrated herein is intended to represent only certain examples of the present disclosure and is not intended to serve as limitations of alternative examples or devices within the spirit and scope of the disclosure.

What is claimed is:

1. A laser module, comprising:

a laser source configured to be coupled to a robotic arm of a robotic device, and emit a laser beam for processing a workpiece having a workpiece surface; and a pair of air knives configured to be coupled to the robotic arm on opposite sides of the laser source, and respectively simultaneously discharge a pair of airflow sheets that are at least non-perpendicular to the laser beam and which entrain surrounding ambient air in a manner respectively forming a pair of expanding air wedges flowing toward the workpiece surface in a direction toward a laser spot where the laser beam impinges the workpiece surface, and the air knives are mounted in a manner such that, when the laser module is viewed along a direction perpendicular to the laser beam and parallel to faces of the airflow sheets as they flow toward the workpiece surface, each of the air wedges at least partially overlaps the laser spot and blows away contaminants generated by impingement of the laser beam.

2. The laser module of claim 1, wherein:
the laser source is one of an ultraviolet (UV) laser source configured to emit a UV laser beam, or an infrared (IR) laser source configured to emit an IR laser beam.

3. The laser module of claim 1, wherein:
the laser source is configured to emit the laser beam as a pulsed laser beam.

4. The laser module of claim 1, further comprising:
a laser module mounting fixture configured to support the laser source and the pair of air knives, and couple the laser module to the robotic arm.

5. The laser module of claim 1, further comprising:
a conditioning module turning mirror configured to redirect the laser beam emitted by the laser source; and
a laser scanner configured to receive the laser beam from the conditioning module turning mirror, and pass the laser beam out of a scanner exit window while scanning the laser beam over a scan field on the workpiece surface.

6. The laser module of claim 5, further comprising:
a conditioning module housing configured to house the conditioning module turning mirror; and
a conditioning module purge system configured to positively pressurize the conditioning module housing, to thereby prevent entry of the contaminants into the conditioning module housing.

7. The laser module of claim 5, further comprising:
a sensor housing configured to house the laser scanner, and having a faceplate having a scanner window cutout sized complementary to the scanner exit window, and forming an air gap between the scanner exit window and the faceplate; and
a sensor housing purge system having a fan configured to draw ambient air into the sensor housing, and discharge the ambient air through the air gap to blow the contaminants away from the scanner exit window.

8. The laser module of claim 5, further comprising:
a fixed focus lens located upstream of the laser scanner, and configured to focus the laser beam on the workpiece surface.

9. The laser module of claim 8, further comprising:
a beam expander mounted upstream of the fixed focus lens and downstream of the conditioning module turning mirror, and configured to change a diameter of the laser beam.

10. The laser module of claim 1, further comprising:
at least one imaging device configured to image the workpiece surface, and perform at least one of:
    transmitting, to a display monitor, images of the workpiece surface and surrounding area for visual monitoring of the workpiece during processing by the laser beam;
    transmitting, to a processor, images of the workpiece surface for performing at least one of:
    determining a location and orientation of the workpiece within a manufacturing cell containing the laser module;
    determining a location of one or more geometric features of the workpiece;
    monitoring the effectiveness of the laser beam in processing the workpiece;
    determining whether the workpiece is being processed within process tolerances;
    generating a record of the processing of the workpiece;

calibrating a laser scanner of the laser module, the laser scanner configured to scan the laser beam over a scan field on the workpiece surface; and
    calibrating a tool center point of the robotic arm.

11. A laser module, comprising:
a laser source configured to be coupled to a robotic arm of a robotic device, and emit laser beam pulses; and
a laser scanner configured to receive the laser beam pulses from the laser source, and scan the laser beam pulses over a scan field on a workpiece surface of a workpiece; and
a pair of air knives configured to be coupled to the robotic arm on opposite sides of the laser source, and respectively simultaneously discharge a pair of airflow sheets that are at least non-perpendicular to the laser beam and which entrain surrounding ambient air in a manner respectively forming a pair of expanding air wedges flowing toward the workpiece surface in a direction toward a laser spot where the laser beam pulses impinge the workpiece surface, and the air knives are mounted in a manner such that, when the laser module is viewed along a direction perpendicular to the laser beam and parallel to faces of the airflow sheets as they flow toward the workpiece surface, each of the air wedges at least partially overlaps the laser spot and blows away contaminants generated by impingement of the laser beam.

12. The laser module of claim 11, wherein:
the laser source is one of an ultraviolet (UV) laser source configured to emit a UV laser beam, or an infrared (IR) laser source configured to emit an IR laser beam.

13. A method of processing a workpiece, comprising:
emitting a laser beam from a laser source of a laser module, and the laser source is coupled to a robotic arm of a robotic device, and the laser beam is configured to process a workpiece surface of the workpiece; and
simultaneously discharging, from a pair of air knives coupled to the robotic arm on opposite sides of the laser source of the laser module, a respective pair of airflow sheets that are at least non-perpendicular to the laser beam and which entrain surrounding ambient air in a manner forming a pair of expanding air wedges flowing toward the workpiece surface in a direction toward a laser spot where the laser beam impinges a workpiece surface, and the air knives are mounted in a manner such that, when the laser module is viewed along a direction perpendicular to the laser beam and parallel to faces of the airflow sheets as they flow toward the workpiece surface, each of the air wedges at least partially overlaps the laser spot and blows away contaminants generated by impingement of the laser beam.

14. The method of claim 13, wherein emitting the laser beam from the laser source comprises one of the following:
    emitting an ultraviolet (UV) laser beam from a UV laser source; or
    emitting an infrared (IR) laser beam from an IR laser source.

15. The method of claim 14, wherein emitting an IR laser beam from an IR laser source comprises:
    maintaining the laser module in an upright orientation when emitting the laser beam from the UV laser source.

16. The method of claim 13, further comprising:
    redirecting, using a conditioning module turning mirror of the laser module, the laser beam emitted by the laser source;
    receiving, at a laser scanner of the laser module, the laser beam from the conditioning module turning mirror; and scanning, using the laser scanner, the laser beam over a scan field on the workpiece surface.

17. The method of claim 16, wherein scanning the laser beam over a scan field comprises:

scanning the laser beam over a hexagonal scan field on the workpiece surface.

18. The method of claim 17, wherein scanning the laser beam over a hexagonal field comprises:

moving, via the robotic arm, the laser module to a first spatial location relative to the workpiece surface;

scanning, using the laser scanner, the laser beam over a first hexagonal scan field having 6 side portions each having a pair of corner portions defining opposing ends of the side portion;

moving, via the robotic arm, the laser module to a second spatial location;

scanning, using the laser scanner, the laser beam over a second hexagonal scan field on the workpiece surface such that one of the side portions and associated corner portions of the second hexagonal scan field respectively overlaps one of the side portions and associated corner portions of the first hexagonal scan field;

moving, via the robotic arm, the laser module to a third spatial location; and scanning, using the laser scanner, the laser beam over a third hexagonal scan field, on the workpiece surface such that one of the side portions and associated corner portions of the third hexagonal scan field respectively overlaps one of the side portions and associated corner portions of the first hexagonal scan field, and another one of the side portions and associated corner portions of the third hexagonal scan field respectively overlaps one of the side portions and associated corner portions of the second hexagonal scan field.

19. The method of claim 13, further comprising:

positively pressurizing a conditioning module housing containing the conditioning module turning mirror, to thereby prevent entry of the contaminants into the conditioning module housing.

20. The method of claim 13, further comprising:

drawing, using a fan, ambient air into a sensor housing containing a laser scanner, the sensor housing having a faceplate having a scanner window cutout that forms an air gap between the faceplate and a scanner exit window of the laser scanner; and discharging the ambient air through the air gap for blowing contaminants away from the scanner exit window.

* * * * *